United States Patent [19]

Apelian et al.

[11] Patent Number: 5,227,353
[45] Date of Patent: Jul. 13, 1993

[54] HYDROPROCESSING CATALYST COMPOSITION

[75] Inventors: Minas R. Apelian, Vinceton; Thomas F. Degnan, Jr., Moorestown; David O. Marler, Deptford; Dominick N. Mazzone, Wenonah, all of N.J.

[73] Assignee: Mobil Oil Corporation, Fairfax, Va.

[21] Appl. No.: 928,549

[22] Filed: Aug. 13, 1992

Related U.S. Application Data

[63] Continuation of Ser. No. 734,987, Jul. 24, 1991, abandoned.

[51] Int. Cl.$^5$ .................................... B01J 29/04
[52] U.S. Cl. .............................. 502/74; 502/60; 502/61; 502/66
[58] Field of Search ................. 502/60, 66, 74, 61

[56] References Cited

U.S. PATENT DOCUMENTS

| | | | |
|---|---|---|---|
| 3,884,835 | 5/1975 | Vaughan | 252/451 |
| 4,091,079 | 5/1978 | Vaughan | 423/328 |
| 4,673,559 | 6/1987 | Derouane et al. | 423/306 |
| 4,791,088 | 12/1988 | Chu et al. | 502/232 |
| 4,880,611 | 11/1989 | von Ballmoos et al. | 423/306 |
| 5,098,684 | 3/1992 | Kresge et al. | 423/277 |
| 5,102,643 | 4/1992 | Kresge et al. | 423/328 |

FOREIGN PATENT DOCUMENTS

| | | |
|---|---|---|
| 0203228 | 3/1986 | European Pat. Off. |
| 0309045 | 3/1989 | European Pat. Off. |
| 0309046 | 3/1989 | European Pat. Off. |
| 0317034 | 5/1989 | European Pat. Off. |

OTHER PUBLICATIONS

Szostak, Zeolites, Facts, Figures, Futures, Ed Jacobs et al., Elsevier Science Publ. bV, 1989, pp. 439-446.

Primary Examiner—Carl F. Dees
Attorney, Agent, or Firm—Alexander J. McKillop; Dennis P. Santini; Malcolm D. Keen

[57] ABSTRACT

Hydroprocessing catalysts of high metal content and surface area are based on a support material comprising a non-layered, ultra-large pore crystalline material. The crystalline material exhibits unusually large pores of at least 13 Å diameter and a high sorption capacity demonstrated by its benzene adsorption capacity of greater than about 15 grams benzene/100 grams at 50 torr and 25° C. and may be characterized by an X-ray diffraction pattern with at least one d-spacing greater than about 18 Å. In a particularly preferred form, the crystalline material has a hexagonal arrangement of pores of at least 13 Å diameter which has an electron diffraction pattern with one line at a $d_{100}$ value greater than about 18 Å. The catalysts based on these materials are capable of accommodating high metal loadings while retaining a high surface area with high pore volume and low density. Because of the high surface area of the support material, the metals may be incorporated by simple impregnation in a single step. The catalysts are particularly useful for process applications requiring high hydrogenation functionality and acidic functionality and therefore are useful in hydrocracking applications without requiring a halogen promoter.

65 Claims, 3 Drawing Sheets

HYDROPROCESSING CATALYST COMPOSITION

CROSS REFERENCE TO RELATED APPLICATIONS

This is a continuation of copending application Ser. No. 07/734,987, filed on July, 24, 1991 and now abandoned.

This application is related to application Ser. No. 07/734,850, filed July 24, 1991, which relates to hydrocracking over catalysts comprising mesoporous crystalline materials as well as to application Ser. No. 07/734,971 and 07/734,999 filed concurrently (Mobil Cases 6283 and 6303), which relates to lube hydrocracking over catalysts comprising mesoporous crystalline materials.

The crystalline catalytic materials used in the present process are described in copending application Ser. No. 07/625,245 (C. T. Kresge et al) filed Dec. 10, 1990, now U.S. Pat. No. 5,098,684, which is a continuation-in-part of Ser. No. 07/470,008, filed Jan. 25, 1990 now U.S. Pat. No. 5,102,643.

FIELD OF THE INVENTION

This invention relates to catalysts which are especially useful for hydrocracking and for other hydroprocessing applications including hydrotreating and hydrofinishing. They are particularly useful for the production of high viscosity index lubricants by hydrocracking mineral oil feedstocks, especially distillate stocks.

BACKGROUND OF THE INVENTION

Hydrocracking is a process which has achieved widespread use in petroleum refining for converting various petroleum fractions to lighter and more valuable products, especially distillates such as jet fuels, diesel oils and heating oils. Hydrocracking is generally carried out in conjunction with an initial hydrotreating step in which the heteroatom-containing impurities in the feed are hydrogenated without a significant degree of bulk conversion. During this initial step, the heteroatoms, principally nitrogen and sulfur, are converted to inorganic form (ammonia, hydrogen-sulfide) and these gases may be removed prior to the subsequent hydrocracking step although the two stages may be combined in cascade without interstage separation as, for example, in the Unicracking-JHC process and in the moderate pressure hydrocracking process described in U.S. Pat. No. 4,435,275.

In the second stage of the operation, the hydrotreated feedstock is contacted with a bifunctional catalyst which possesses both acidic and hydrogenation/dehydrogenation functionality. In this step, the characteristic hydrocracking reactions occur in the presence of the catalyst. Polycyclic aromatics in the feed are hydrogenated, and ring opening of aromatic and naphthenic rings takes place together with dealkylation. Further hydrogenation may take place upon opening of the aromatic rings. Depending upon the severity of the reaction conditions, the polycyclic aromatics in the feed will be hydrocracked to paraffinic materials or, under less severe conditions, to monocylic aromatics as well as paraffins. Naphthenic and aromatic rings may be present in the product, for example, as substituted naphthenes and substituted polycyclic aromatics in the higher boiling products, depending upon the degree of operational severity.

The bifunctional catalyst used in the hydrocracking process typically comprises a metal component which provides the hydrogenation/dehydrogenation functionality and a porous, inorganic oxide support provides the acidic function. The metal component typically comprises a combination of metals from Groups IVA, VIA and VIIIA of the Periodic Table (IUPAC Table) although single metals may also be encountered. Combinations of metals from Groups VIA and VIIIA are especially preferred, such as nickel-molybdenum, cobalt-molybdenum, nickel-tungsten, cobalt-nickel-molybdenum and nickel-tungsten-titanium. Noble metals of Group VIIIA especially platinum or palladium may be encountered but are not typically used for treating high boiling feeds which tend to contain significant quantities of heteroatoms which function as poisons for these metals.

The porous support which provides the acidic functionality in the catalyst may comprise either an amorphous or a crystalline material or both. Amorphous materials have significant advantages for processing very high boiling feeds which contain significant quantities of bulky polycyclic materials (aromatics as well as polynapthenes) since the amorphous materials usually possesses pores extending over a wide range of sizes and the larger pores, frequently in the size range of 100 to 400 Angstroms (Å) are large enough to provide entry of the bulky components of the feed into the interior structure of the material where the acid-catalyzed reactions may take place. Typically amorphous materials of this kind include alumina and silica-alumina and mixtures of the two, possibly modified with other inorganic oxides such as silica, magnesia or titania.

Crystalline materials, especially the large pore size zeolites such as zeolites X and Y, have been found to be useful for a number of hydrocracking applications since they have the advantage, as compared to the amorphous materials, of possessing a greater degree of activity, which enables the hydrocracking to be carried out at lower temperatures at which the accompanying hydrogenation reactions are thermodynamically favored. In addition, the crystalline tend to be more stable in operation than the amorphous materials such as alumina. The crystalline materials may, however, not be suitable for all applications since even the largest pore sizes in these materials, typically about 7.4 Å in the X and Y zeolites, are too small to permit access by various bulky species in the feed. For this reason, hydrocracking of residuals fractions and high boiling feeds has generally required an amorphous catalyst of rather lower activity. Although it would be desirable, if possible, to integrate the advantages of the amorphous and the crystalline material is hydrocracking catalysts and although the possibility of using active supports for crystalline materials has been proposed, the difference in activity and selectivity between the amorphous and crystalline materials has not favored the utilization of such catalysts.

The crystalline hydrocracking catalysts based on zeolites such as zeolites X and Y generally tend to produce significant quantities of gasoline boiling range materials (approximately 330° F.-, 165° C.-) materials as product. Since hydrocracked gasolines tend to be of relatively low octane and require further treatment as by reforming before the product can be blended into the refinery gasoline pool, hydrocracking is usually not an attractive route for the production of gasoline. On the other hand, it is favorable to the production of distillate fractions, especially jet fuels, heating oils and diesel fuels since the hydrocracking process reduces the heteroatom impurities characteristically present in these fraction to the low level desirable for these products. The selectivity of crystalline aluminosilicate catalysts for distillate production may be improved by the use of highly siliceous zeolites, for example, the zeolites possessing a silica: alumina ratio of 50:1 or more, as described in U.S. Pat. No. 4,820,402 (Partridge et al), but even with this advance in the technology, it would still be desirable to integrate the characteristics of the amorphous materials with their large pore sizes capable of accommodating the bulky components of typical hydrocracking feeds, with the activity of the zeolite catalysts.

While the considerations set out above apply mostly to fuels hydrocracking processes, they will also be relevant in greater or lesser measure to lube hydrocracking. In the lube hydrocracking process, which is well established in the petroleum refining industry, an initial hydrocracking step is carried out under high pressure in the presence of a bifunctional step catalyst which effects partial saturation and ring opening of the aromatic components which are present in the feed. The hydrocracked product is then subjected to dewaxing in order to reach the target pour point since the products from the initial hydrocracking step which are paraffinic in character include components with a relatively high pour point which need to be removed in the dewaxing step.

In theory, as well as in practice, lubricants should be highly paraffinic in nature since paraffins possess the desirable combination of low viscosity and high viscosity index. Normal paraffins and slightly branched paraffins e.g. n-methyl paraffins, are waxy materials which confer an unacceptably high pour point on the lube stock and are therefore removed during the dewaxing operations in the conventional refining process described above. It is, however, possible to process waxy feeds in order to retain many of the benefits of their paraffinic character while overcoming the undesirable pour point characteristic. A severe hydrotreating process for manufacturing lube oils of high viscosity index is disclosed in *Developments in Lubrication* PD 19(2), 221-228, S. Bull et al, and in this process, waxy feeds such as waxy distillates, deasphalted oils and slack waxes are subjected to a two-stage hydroprocessing operation in which an initial hydrotreating unit processes the feeds in block operation with the first stage operating under higher temperature conditions to effect selective removal of the undesirable aromatic compounds by hydrocracking and hydrogenation. The second stage operates under relatively milder conditions of reduced temperature at which hydrogenation predominates, to adjust the total aromatic content and influence the distribution of aromatic types in the final product. The viscosity and flash point of the base oil are then controlled by topping in a subsequent redistillation step after which the pour point of the final base oil is controlled by dewaxing in a solvent dewaxing (MEK-toluene) unit. The slack waxes removed from the dewaxer may be reprocessed to produce a base oil of high viscosity index. Processes of this type, employing a waxy feed which is subjected to hydrocracking over an amorphous bifunctional catalyst such as nickel-tungsten on alumina or silica-alumina are disclosed, for example, in British Patents Nos. 1,429,949, 1,429,291 and 1,493,620 and U.S. Pat. Nos. 3,830,273, 3,776,839, 3,794,580, and 3,682,813.

In lube processes of this kind, the catalyst is, like the fuels hydrocracking catalyst, typically a bifunctional catalyst containing a metal hydrogenation component on an amorphous acidic support. The metal component is usually a combination of base metals, with one metal selected from the iron group (Group VIIIA) and one metal from Group VIA of the Periodic Table, for example, nickel in combination with molybdenum or tungsten. The activity of the catalyst may be increased by the use of fluorine, either by incorporation into the catalyst during its preparation in the form of a suitable fluorine compound or by in situ fluoriding during the operation of the process, as disclosed in GB 1,390,359.

Although the lube hydrocracking processes using an amorphous catalyst for the treatment of the waxy feeds has shown itself to be capable of producing high V.I. lubricants, it is not without its limitations. The major process objective in lube hydrocracking (LHDC) is to saturate the aromatic components in the feed to produce saturated cyclic compounds (naphthenes) or, by ring opening of the naphthenes, paraffinic materials of improved lubricating properties. This requires the hydrogenation activity of the catalyst to be high. There is no corresponding requirement for a high level of cracking activity since no major change in boiling range is required or even desirable: the amount of material in the lube boiling range, typically 650° F.+, should be maintained at the maximum level consistent with the degree of ring opening required to furnish a lube product of the desired quality. This combination of requirements has typically led to the use of LHDC catalysts with high metals loadings, particularly for base metal combinations with Group VIA metals such as tungsten: commercial LHDC catalysts currently available have typical nickel loadings of about 5 percent but the tungsten loading may be in the range of 10 to 25 percent.

The use of high metal loadings, although necessary for the hydrogenation function, brings a concomitant disadvantage, that the surface area decreases with increasing metal content, so that the area available for the acid-catalyzed reactions decreases and it is usually necessary to resort to the use of acidity promoters such as fluorine to restore the acidity to the requisite level. There are environmental and metallurgical (corrosion) concerns associated with the use of fluorine and other promoters used with these catalysts, regardless of whether the promoter is added to the catalyst initially or, as is more common, by the use of a promoter which is sorbed onto the catalyst immediately prior to use or continuously during operation.

Another problem with the use of high metal loadings is that it becomes progressively more difficult to introduce the metal into the porous structure of the catalyst as the metal content increases: the metal already on the catalyst tends to block the pores of the catalyst so that nor more metal can enter. To overcome this problem, the metal may be incorporated into the catalyst during its manufacture by adding the metal in the form of a solution at the hydrogel stage. The metal-containing hydrogel is then calcined so that the metal is uniformly distributed throughout the pore structure of the catalyst. Processes of this type are described in British Patents Nos. 1,398,384; 1,493,620; 1,546,398 and 1,565,425. This process, however, is not preferred to impregnation or exchange because typically produces catalysts having poorer metals dispersion. The metals have a greater opportunity to agglomerate during all the process steps which follow the introduction of the metals.

With these factors in mind, it becomes clear that it would be desirable to have the capability to formulate a catalyst with high metals loading which could be manufactured by simple exchange or impregnation techniques and which retained a high surface area even at high metals loadings. Such catalysts would be of especial use for LHDC processes but would also find application for other hydrotreating processes such as hydrogenation, hydrofinishing, and for hydrodemetallation, especially of high metal content petroleum fractions such as residual fractions, shale oil and the like.

SUMMARY OF THE INVENTION

We have now found that mesoporous siliceous materials may be used as the basis for hydroprocessing catalysts of this type. The high intrinsic surface area of the mesoporous materials enables high metal loadings to be accommodated while still retaining high surface area in the catalyst, so that a high level of hydrogenation activity is obtained while sufficient surface area remains for the acidic functionality to remain at levels which permit promoters such as fluorine to be eliminated. In addition, the high porosity of these materials enables the metals to be incorporated by simple exchange or impregnation techniques without the need to resort to the time-consuming necessity of adding the metals to the hydrogel with the consequent likelihood of producing an inferior product.

These mesoporous siliceous materials have a novel and unique pore geometry and, in a preferred form described below, are characterized by a substantially uniform hexagonal honeycomb microstructure with uniform pores having a cell diameter greater than 13 Å and typically in the range of 20 to 100 Å. Most prominent among these materials is a new metallocilicate identified as MCM-41 which is usually synthesized with Bronsted acid sites by incorporating a tetrahedrally coordinated trivalent element such as Al, Ga, B, or Fe within the silicate framework. Aluminosilicate materials of this type possess good thermal and chemical stability and may be used as the basis of LHDC catalysts which exhibit the correct balance of hydrocracking activity and aromatic saturation selectively to produce conventional VI lubricating oils (i.e. 75-100 VI) in higher lube yields compared to unpromoted USY and amorphous catalysts when used in LHDC processes. Furthermore, the present catalysts exhibit improved conversion activity in LHDC compared to conventional amorphous fluorided catalysts with no penalty in yield/VI selectivity when using slack wax feeds, as described in our co-pending application Ser. No. 07/734,999, field concurrently (Mobil Case 6303).

DETAILED DESCRIPTION

Catalyst Metal Component

The catalysts are bifunctional catalysts which comprise a mesoporous crystalline material as described below as the component which acts as a support and in addition, provides the desired acidic functionality for the acid-catalysed reactions, together with a metal hydrogenation-dehydrogenation component. The hydrogenation-dehydrogenation component is provided by a metal or combination of metals. Noble metals of Group VIIIA, especially platinum, or palladium may be utilized but the major application of the present mesoporous materials will be with base metals since, by incorporating a high level of base metals such as nickel or tungsten, good hydrogenation activity may be achieved with feeds which contain high levels of sulfur or other contaminants, for example, above 10 ppm sulfur and higher e.g. 30 ppm. The potential is also created for elevating the hydrogenation functionality to the levels conventionally associated with the noble metals. Accordingly, base metals of Groups IVA, VIA and VIII, especially chromium, molybdenum, tungsten, cobalt and nickel, may be used in the present catalysts. Base metal combinations of a Group VIIIA metal in combination with a Group IVA or VIA metal are particularly preferred, especially for hydrocracking applications. Combinations such as nickel-molybdenum, cobalt-nickel, nickel-tungsten, cobalt-nickel-molybdenum and nickel-tungsten-titanium are therefore preferred.

The content of the metal component will normally be chosen according to its catalytic activity and the intended utility. Thus, the highly active noble metals may be used in smaller amounts than the less active base metals. For example, about 1 wt. percent or less platinum will be effective and in a typical base metal combination, about 5 to 15 weight percent nickel and about 5 to about 40 wt. percent tungsten, expressed as metal will achieve the desired degree of hydrogenation functionality.

The present support materials are notable in that they are capable of including a greater proportion of metal than previous support materials because of their extraordinarily large surface area and as a result, the metal-containing catalysts retain a large surface area after incorporation of the metal component. The surface area, S, of the present catalysts, expressed in $m^2 \cdot g^{-1}$. (square meters per gram) may be given by the equation:

$$S \geq 600 - 13.3X$$

where X is the metal loading in weight percent.

Thus, the surface area of the metals-containing catalysts determined by empirical means such as the B-E-T (Bruenauer-Emmet-Teller) test (see ASTM D 3663), will be found to be at least as great as the value given by the above equation. The value of S as given by this relationship decreases to zero at about 45 percent metals content but since the surface area S may be greater than the value given by the relationship, surface area remains at metal loadings above this value. The minimum surface area will, however, be at least 5 $m^2g^{-1}$ at these very high metal loadings. The actual surface area of the metal-containing catalyst may, as noted above, be determined empirically by the method set out in ASTM D 3663.

As may be appreciated from the equation above the surface area of the catalyst will be at least 200 $m^2g^{-1}$ even at high metal loadings as high as 30 weight percent and at loadings above this value, remains at an unconventionally high value. The metal component usually exceeds 12.9 weight percent (total metals, based on the entire catalyst weight) and may exceed about 30 weight percent, e.g. 30–40 weight percent, of the entire catalyst while still retaining a surface area of at least 200 $m^2 g^{-1}$, e.g. 240 $m^2g^{-1}$ or even higher. At lower metal contents, the surface area will be correspondingly higher so that, for example, at a total metal content of about 20 weight percent of the entire catalyst, the surface area will be at least 300 $m^2g^{-1}$ or higher, larger by a factor of almost three or more compared to conventional amorphous catalysts with similar metal loadings. At about 12 to 15 percent total metal, e.g., 13 percent, the surface area will be at least 400 $m^2g^{-1}$. Catalysts containing at least about 25 weight percent total metal with a retained surface area of at least 250 $m^2g^{-1}$ constitute a highly useful class of bifunctional catalysts.

Another advantage accruing from the use of the mesoporous supports is that in spite of the high metal loadings which may be accommodated, the density of the catalyst remains relatively low, compared to conventional catalysts. At a total metal content of about 12 to 15 weight percent, for example, e.g. at levels exceeding the normal minimum loading of 12.9 percent, the real density of the catalyst is about 2.8 $g.cc^{-1}$, as compared to conventional catalysts which have real densities of at least about 4 at these loadings. At higher loadings, a similar advantage prevails; the present catalysts are only about three-fourths as dense as conventional catalysts at comparable metal loadings. For example, at metal loadings of about 20 to 25 weight percent of the entire catalyst, the real density will be in the range of 3.000 to 3.300 $g.cc^{-1}$, as compared to about 4.00 to 4.2 for conventional catalysts. At metal loadings above about 30 weight percent, the real density will be in the range of about 4.1 to 4.3 $g.cc^{-1}$, for example, at 35 percent metal, the real density is 4.2 $g.cc^{-1}$. Although one advantage of the high porosity is that the present catalysts have a low density as compared to conventional catalysts, the high porosity of the mesoporous support materials, on the other hand, permits very high metal loadings so that real densities up to 6.0 $g.cc.^{-1}$ may be achieved. Particle densities range from about 0.88 at about 12 to 15 weight percent metal to about 1.0 at about 20 to 25 weight percent metal and about 1.1 at 30 to 40 weight percent metal. Real densities are determined by measuring the volume of mercury displaced by a given weight of catalyst. For a discussion of real and particle densities, see ASTM D 3766, which uses the term skeletal density as a synonym for real density.

Pore volumes are commensurately high: the present catalysts have a pore volume of at least 0.55 $cc/g^{-1}$ and usually higher, typically at least about 0.6 $cc.g^{-1}$ at metal loadings as high as 20 weight percent. Pore volumes are determined by subtracting the inverse of the real density from the inverse of the particle density.

The hydrogenation component can be exchanged onto the support material, impregnated into it or physically admixed with it, or any combination of these methods. If the metal is to be impregnated into or exchanged onto the mesoporous support, it may be done, for example, by treating the calcined material with a metal-containing cation. A preferred exchange technique involves competitive exchange in the presence of ammonium cations (which are converted into hydrogen on subsequent calcination); it is thought that this technique may disperse the metal cations more evenly throughout the pore structure of the support material. Metals which form stable anions are suitable for incorporation by impregnation; typical anionic complexes such as the molybdate, vanadate and metatungstate ions may be used to incorporate molybdenum, vanadium and tungsten. Other metals may be incorporated using suitable anionic complexes in the same way. Cationic forms of metal exchanged onto the crystalline material or impregnated into it. A particular advantage of the present catalysts is that the high loadings of two or more metals may be incorporated by a single impregnation onto the calcined material using the incipient wetness technique rather than successive impregnations with the different metals; this produces a more uniform distribution of the two or more metals in the catalyst. It is an additional advantage that the high metals levels, above about 25 weight percent total metal may be incorporated by impregnation into the calcined material as distinct from the conventional techniques requiring incorporation of a solution of the metal component(s) into a hydrogel prior to calcination. The fact that the present catalysts have good bifunctional activity without the necessity for halogen promoter also enables the halogen promoter to be dispensed with; it need not be added during the manufacture of the catalyst or during operation of the process unless particularly high levels of acidity are desired.

Mesoporous Crystalline Component

The acidic component of the hydrocracking catalyst is a mesoporous crystalline material which is described in detail below. When it is used in the present catalysts, the mesoporus crystalline material is at least partly in the decationized or hydrogen form in order to provide the desired acidic functionality for the cracking reactions which are to take place.

The catalytic material used in the present invention includes a novel synthetic composition of matter comprising an ultra-large pore size crystalline phase. This material is an inorganic, porous, non-layered crystalline phase material with a high surface area which is manifested in its benzene sorption capacity of greater than 15 grams of benzene per 100 grams of the the material at 50 torr and 25° C. These materials can be characterized (in the calcined form) by an X-ray diffraction pattern with at least one peak at a d-spacing breater than about 18 Å with a relative intensity of 100. Although the characteristic structure of the crystalline material persists in the catalyst, the presence of large amounts of metals may obscure the X-ray pattern and for this reason, it may be desirable to determine the X-ray pattern prior to addition of the metal component.

The preferred form of crystalline material is inorganic, porous, non-layered material having a hexagonal arrangement of uniformly-sized pores with a maximum perpendicular cross-section pore dimension of at least about 13 Å(Å), and typically within the range of from about 13 Å to about 200 Å. A preferred form of this hexagonal crystalline composition, identified as having the structure of MCM-41, exhibits a hexagonal electron diffraction pattern that can be indexed with a $d_{100}$ value greater than about 18 Å, and a benzene adsorption capacity of greater than about 15 grams benzene/100 grams crystal at 50 torr and 25° C. This material is described in detail in Ser. No. 07/625,245 and below.

The inorganic, non-layered mesoporous crystalline material used as a component of the catalyst has the following compositions:

$$M_{n/q}(W_aX_bY_cZ_dO_h)$$

wherein W is a divalent element, such as a divalent first row transition metal, e.g., manganese, cobalt and iron, and/or magnesium, preferably cobalt; X is a trivalent element, such as aluminum, boron, iron and/or gallium, preferably aluminum; Y is a tetravalent element such as silicon and/or germanium, preferably silicon; Z is a pentavalent element, such as phosphorus; M is one or more ions, such as, for example, ammonium, Group IA, IIA and VIIB ions, usually hydrogen, sodium and/or fluoride ions; n is the charge of the composition excluding M expressed as oxides; q is the weighted molar average valence of M; n/q is the number of moles or mole fraction of M; a, b, c, and d are mole fractions of W, X, Y and Z, respectively; h is a number of from 1 to 2.5; and (a+b+c+d)=1.

A preferred embodiment of the above crystalline material is when (a+b+c) is greater than d, and h=2. A further embodiment is when a and d=0, and h=2. The preferred materials for use in making the present catalysts are the aluminosilicates although other metallosilicates may also be used.

In the as-synthesized form, the support material has a composition, on an anhydrous basis, expressed empirically as follows:

$$rRM_{n/q}(W_aX_bY_cZ_dO_H)$$

where R is the total organic material not included in M as an ion, and r is the coefficient for R, i.e. the number of moles or mole fraction of R.

The M and R components are associated with the material as a result of their presence curing crystallization, and are easily removed or, in the case of M, replaced by post-crystallization methods described below.

To the extent desired, the original M, e.g. sodium or chloride, ions of the as-synthesized material of this invention can be replaced in accordance with conventional ion-exchange techniques. Preferred replacing ions include metal ions, hydrogen ions, hydrogen precursor, e.g., ammonium, ions and mixtures of these ions. Particularly preferred ions are those which provide the desired metal functionality in the final catalyst. These include hydrogen, rare earth metals and metals of Groups VIIA (e.g. Mn), VIIIA (e.g. Ni), IB (e.g. Cu), IVB (e.g. Sn) of the Periodic Table of the Elements and mixtures of these ions.

The crystalline (i.e. having sufficient order to provide a diffraction pattern such as, for example, by X-ray, electron or neutron diffraction, following calcination with at least one peak) mesoporous material may be characterized by its structure, which includes extremely large pore windows as well as by its high sorption capacity. The term "mesoporous" is used here to indicate crystals having uniform pores within the range from about 13 Å to about 200 Å. The mesoporous materials have uniform pores within the range of from about 13 Å to about 200 Å, more usually from about 15 Å to about 100 Å. Since these pores are significantly larger than those of other crystalline materials, it is appropriate to refer to them as ultra-large pore size materials. For the purpose of this application, a working definition of "porous" is a material that adsorbs at least 1 gram of a small molecule, such as Ar, $N_2$, n-hexane or cyclohexane, per 100 grams of the solid.

The catalytic material can be distinguished from other porous inorganic solids by the regularity of its large open pores, whose pore size more nearly resembles that of amorphous or paracrystalline materials, but whose regular arrangement and uniformity of size (pore size distribution within a single phase of, for example, ±25%, usually ±15% or less of the average pore size of that phase) resemble more those of crystalline framework materials such as zeolites. The preferred materials have a hexagonal arrangement of large open channels that can be synthesized with open internal diameters from about 13 Å to about 200 Å. The term "hexagonal" is intended to encompass not only materials that exhibit mathematically perfect hexagonal symmetry within the limits of experimental measurement, but also those with significant observable deviations from that ideal state. A working definition as applied to the microstructure of the present invention would be that most channels in the material would be surrounded by six nearest neighbor channels at roughly the same distance. Defects and imperfections will cause significant numbers of channels to violate this criterion to varying degrees, depending on the quality of the material's preparation. Samples which exhibit as much as 25% random deviation from the average repeat distance between adjacent channels still clearly give recognizable image of the present ultra-large pore materials. Comparable variations are also observed in the $d_{100}$ values from the electron diffraction patterns.

The most regular preparations of the support material give an X-ray diffraction pattern with a few distinct maxima in the extreme low angle region. The positions of these peaks approximately fit the positions of the hk0 reflections from a hexagonal lattice. The X-ray diffraction pattern, however, is not always a sufficient indicator of the presence of these materials, as the degree of regularity in the microstructure and the extend of repetition of the structure within individual particles effect the number of peaks that will be observed. Indeed, preparations with only one distinct peak in the low angle region of the X-ray diffraction pattern have been found to contain substantial amounts of the material in them. Other techniques to illustrate the microstructure of this material are transmission electron microscopy and electron diffraction. Properly oriented specimens of the material show a hexagonal arrangement of large channels and the corresponding electron diffraction pattern gives an approximately hexagonal arrangement of diffraction maxima. The $d_{100}$ spacing of the electron diffraction patterns is the distance between adjacent spots on the hk0 projection of the hexagonal lattice and is related to the repeat distance $a_0$ between channels observed in the electron micrographs through the formula $d_{100}=a_0/3/2$. This $d_{100}$ spacing observed in the electron diffraction patterns corresponds to the d-spacing of a low angle peak in the X-ray diffraction pattern of the material. The most highly ordered preparations of the material obtained so far have 20-40 distinct spots observable in the electron diffraction patterns. These patterns can be indexed with the hexagonal hk0 subset to unique reflections of 100, 110, 200, 210, etc., and their symmetry-related reflections.

In its calcined form, the crystalline material may be further characterized by an X-ray diffraction pattern with at least one peak at a position greater than about 10 Angstrom Units d-spacing (4.909° $2\theta$ for Cu K-alpha radiation) which corresponds to the $d_{100}$ value of the electron diffraction pattern of the material, and an equilibrium benzene adsorption capacity of greater than about 15 grams benzene/100 grams crystal at 50 torr and 25° C. (basis: crystal material having been treated in an attempt to insure no pore blockage by incidental contaminants, if necessary).

The equilibrium benzene adsorption capacity characteristic of this material is measured on the basic of no pore blockage by incidental contaminants. For instance, the sorption test will be conducted on the crystalline material phase having any pore blockage contaminants and water removed by ordinary methods. Water may be removed by dehydration techniques, e.g. thermal treatment. Pore blocking inorganic amorphous materials, e.g., silica, and organics may be removed by contact with acid or base or other chemical agents such that the detrital material will be removed without detrimental effect on the crystal.

More particularly, the calcined crystalline non-layered material may be characterized by an X-ray diffraction pattern with at least two peaks at positions greater than about 10 Å d-spacing (8.842°$\theta$ for Cu K-alpha radiation), at least one of which is at a position grater than about 18 Å d-spacing, and no peaks at positions less than about 10 Å d-spacing with relative intensity greater than about 20% of the strongest peak. Still more particularly, the X-ray diffraction pattern of the calcined material of this invention will have no peaks at positions less than about 10 Å d-spacing with relative intensity greater than about 10% of the strongest peak. In any event, at least one peak in the X-ray diffraction pattern will have a d-spacing that corresponds to the $d_{100}$ value of the electron diffraction pattern of the material.

The calcined inorganic, non-layered crystalline material may also be characterized as having a pore size of about 13 Å or greater as measured by physisorption measurements, described below. Pore size is considered a maximum perpendicular cross-section pore dimension of the crystal.

X-ray diffraction data were collected on a Scintag PAD X automated diffraction system employing theta-theta geometry, Cu K-alpha radiation, and an energy dispersive X-ray detector. Use of the energy dispersive X-ray detector eliminated the need for incident or diffracted beam monochromators. Both the incident and diffracted X-ray beams were collimated by double slit incident and diffracted collimation systems. The slit sizes used, starting from the X-ray tube source, were 0.5, 1.0, 0.3 and 0.2 mm, respectively. Different slit systems may produce differing intensities for the peaks. The materials of the present invention that have the largest pore sizes may require more highly collimated incident X-ray beam in order to resolve the low angle peak from the transmitted incident X-ray beam.

The diffraction data were recorded by step-scanning at 0.04 degrees of $2\theta$, where $\theta$ is the Bragg angle, and a counting time of 10 seconds for each step,. The interplanar spacings, d's, were calculated in Å(A), and the relative intensities of the lines, $I/I_o$, where $I_o$ is one-hundredth of the intensity of the strongest line, above background, were derived with the use of a profile fitting routine. The intensities were uncorrected for Lorentz and polarization effects. The relative intensities are given in terms of the symbols vs=very strong (74–100), s=strong (50–74), m=medium (25–49) and w=weak (0–24). The diffraction data listed as single lines may consist of multiple overlapping lines which under certain conditions, such as very high experimental resolution or crystallographic changes, may appear as resolved or partially resolved lines. Typically, crystallographic changes can include minor changes in unit cell parameters and/or a change in crystal symmetry, without a substantial change in structure. These minor effects, including changes in relative intensities, can also occur as a result of differences in cation content, framework composition, nature and degree of pore filling, thermal and/or hydrothermal history, and peak width/shape variations due to particle size/shape effects, structural disorder or other factors known to those skilled in the art of X-ray diffraction.

The equilibrium benzene capacity is determined by contacting the material of the invention, after dehydration or calcination at, for example, about 540° C. for at least about one hour and other treatment, if necessary, in an attempt to remove any pore blocking contaminants, at 25° C. and 50 torr benzene until equilibrium is reached. The weight of benzene sorbed is then determined as described below.

The ammonium form of the catalytic material may be readily converted to the hydrogen form by thermal treatment (calcination). This thermal treatment is generally performed by heating one of these forms at a temperature of at least 400° C. for at least 1 minute and generally not longer than 20 hours, preferably from about 1 to about 10 hours. While subatmospheric pressure can be employed for the thermal treatment, atmospheric pressure is desired for reasons of convenience, such as in air, nitrogen, ammonia, etc. The thermal treatment can be performed at a temperature up to about 750° C. The thermally treated product is particularly useful in the catalysis of certain hydrocarbon conversion reactions and it is preferred that the material should be in this from for use in the present catalysts.

The crystalline material can be prepared by one of several methods, each with particular limitations.

A first method involves a reaction mixture having an $X_2O_3/YO_2$ mole ratio of from 0 to about 0.5, but an $Al_2O_3/SiO_2$ mole ratio of from 0 to 0.01, a crystallization temperature of from about 25° C. to about 250° C., preferably from about 50° C. to about 175° C., and an organic directing agent, hereinafter more particularly described, or, preferably a combination of that organic directing agent plus an additional organic directing agent, described below. This first method comprises preparing a reaction mixture containing sources of, for example, alkali or alkaline earth metal (M), e.g. sodium or potassium, cation if desired, one or a combination of oxides selected from the group consisting of divalent element W, e.g., cobalt, trivalent element X, e.g., aluminum, tetravalent element Y, e.g. silicon, and pentavalent element Z, e.g. phosphorus, an organic (R) directing agent, described below, and a solvent or solvent mixture, such as, for example, $C_1$–$C_6$ alcohols, $C_1$–$C_6$ diols and/or water, especially water. The reaction mixture has a composition, in terms of mole ratios of oxides, within the following ranges:

| Reactants | Useful | Preferred |
|---|---|---|
| $X_2O_3/YO_2$ | 0 to 0.5 | 0.001 to 0.5 |
| $Al_2O_3/SiO_2$ | 0 to 0.01 | 0.001 to 0.01 |
| $X_2O_3/(YO_2 + Z_2O_5)$ | 0.1 to 100 | 0.1 to 20 |
| $X_2O_3/(YO_2 + WO + Z_2O_5)$ | 0.1 to 100 | 0.1 to 20 |
| Solvent/ $(YO_2 + WO + Z_2O_5 + X_2O_3)$ | 1 to 1500 | 5 to 1000 |
| $OH^-/YO_2$ | 0 to 10 | 0 to 5 |
| $(M_{2/e}O + R_{2/f}O)/ (YO_2 + WO + Z_2O_5 + X_2O_3)$ | 0.01 to 20 | 0.05 to 5 |
| $M_{2/e}O/ (YO_2 + WO + Z_2O_5 + X_2O_3)$ | 0 to 10 | 0 to 5 |
| $R_{2/f}O/ (YO_2 + WO + Z_2O_5 + X_2O_3)$ | 0.01 to 2.0 | 0.03 to 1.0 | where e and f are the weighted average valences of M and R, respectively.

In this first method, when no Z and/or W oxides are added to the reaction mixture, the pH is important and must be maintained at from about 9 to about 14. When Z and/or W oxides are present in the reaction mixture, the pH is not narrowly important for synthesis of the present crystalline material. In this, as well as the following methods for synthesis of the present material the $R_{2/f}O/(YO_2+WO+Z_2O_5+X_2O_3)$ ratio is important. When this ratio is less than 0.01 or greater than 2.0, impurity products tend to be synthesized at the expense of the desired crystalline material.

A second method for synthesis of the crystalline material involves a reaction mixture having an $X_2O_3/YO_2$ mole ratio from about 1 to about 0.5, a crystallization temperature of from about 25° C. to about 250° C., preferably from about 50° C. to about 175° C., and two separate organic directing agents, i.e. the organic and additional organic directing agents, described below. This second method comprises preparing a reaction mixture containing sources of, for example, alkali or alkaline earth metal (M), e.g. sodium or potassium, cation if desired, one or a combination of oxides selected from the group consisting of divalent element W, e.g. cobalt, trivalent element X, e.g. aluminum, tetravalent element Y, e.g. silicon, and pentavalent element Z, e.g. phosphorus, a combination of organic directing agent and additional organic directing agent (R), each described below, and a solvent or solvent mixture, such as, for example, $C_1$-$C_6$ alcohols, $C_1$-$C_6$ diols and/or water, especially water. The reaction mixture has a composition, in terms of mole ratios of oxides, within the following ranges:

| Reactants | Useful | Preferred |
|---|---|---|
| $X_2O_3/YO_2$ | 0 to 0.5 | 0.001 to 0.5 |
| $X_2O_3/(YO_2 + Z_2O_5)$ | 0.1 to 100 | 0.1 to 20 |
| $X_2O_3/(YO_2 + WO + Z_2O_5)$ | 0.1 to 100 | 0.1 to 20 |
| Solvent/ $(YO_2 + WO + Z_2O_5 + X_2O_3)$ | 1 to 1500 | 5 to 1000 |
| $OH^-/YO_2$ | 0 to 10 | 0 to 5 |
| $(M_{2/e}O + R_{2/f}O)/(YO_2 + WO + Z_2O_5 + X_2O_3)$ | 0.01 to 20 | 0.05 to 5 |
| $M_{2/e}O/(YO_2 + WO + Z_2O_5 + X_2O_3)$ | 0 to 10 | 0 to 5 |
| $R_{2/f}O/(YO_2 + WO + Z_2O_5 + X_2O_3)$ | 0.1 to 2.0 | 0.12 to 1.0 | where e and f are the weighted average valences of M and R, respectively.

In this second method, when no Z and/or W oxides are added to the reaction mixture, the pH is important and must be maintained at from about 9 to about 14. When Z and/or W oxides are present in the reaction mixture, the precise value of the pH is not important for crystallization.

A third method for synthesis of the crystalline material is where X comprises aluminum and Y comprises silicon, the crystallization temperature must be from about 25° C. to about 175° C., preferably from about 50° C. to about 150° C., and an organic directing agent, described below, or, preferably a combination of that organic directing agent plus an additional organic agent, described below, is used. This third method comprises preparing a reaction mixture containing sources of, for example, alkali or alkaline earth metal (M), e.g. sodium or potassium, cation if desired, one or more sources of aluminum and/or silicon, an organic (R) directing agent, hereinafter more particularly described, and a solvent or solvent mixture, such as, for example $C_1$-$C_6$ alcohols, $C_1$-$C_6$ diols and/or water, especially water. The reaction mixture has a composition, in terms of mole ratios of oxides, within the following ranges:

| Reactants | Useful | Preferred |
|---|---|---|
| $Al_2O_3/SiO_2$ | 0 to 0.5 | 0.001 to 0.5 |
| Solvent/$SiO_2$ | 1 to 1500 | 5 to 1000 |
| $OH^-/SiO_2$ | 0 to 10 | 0 to 5 |
| $(M_{2/e}O + R_{2/f}O)/(SiO_2 + Al_2O_3)$ | 0.01 to 20 | 0.05 to 5 |
| $M_{2/e}O/(SiO_2 + Al_2O_3)$ | 0 to 5 | 0 to 3 |
| $R_{2/f}O/(SiO_2 + Al_2O_3)$ | 0.01 to 2 | 0.03 to 1 | where e and f are the weighted average valences of M and R, respectively.

In this third method, the pH is important and must be maintained at from about 9 to about 14. This method involves the following steps:

(1) Mix the organic (R) directing agent with the solvent or solvent mixture such that the mole ratio of solvent/$R_{2/f}O$ is within the range of from about 50 to about 800, preferably from about 50 to 500. This mixture constitutes the "primary template" for the synthesis method.

(2) To the primary template mixture of step (1) add the sources of oxides, e.g., silica and/or alumina such that the ratio $R_{2/f}O/(SiO_2+Al_2O_3)$ is within the range of from about 0.01 to about 2.0.

(3) Agitate the mixture resulting from step (2) at a temperature of from about 20° C. to about 40° C., preferably for from about 5 minutes to about 3 hours.

(4) Allow the mixture to stand with or without agitation, preferably at a temperature of from about 20° C. to about 100° C., and preferably for from about 10 minutes to about 24 hours.

(5) Crystallize the product from step (4) at a temperature of from about 50° C. to about 175° C., preferably for from about 1 hour to about 72 hours. Crystallization temperatures higher in the given ranges are most preferred.

A fourth method for the present synthesis involves the reaction mixture used for the third method, but the following specific procedure with tetraethylorthosilicate the source of silicon oxide:

(1) Mix the organic (R) directing agent with the solvent or solvent mixture such that the mole ratio of solvent/$R_{2/f}O$ is within the range of from about 50 to about 800, preferably from about 50 to 500. This mixture constitutes the "primary template" for the synthesis method.

(2) To the primary template mixture of step (1) with tetraethylorthosilicate and a source of aluminum oxide, if desired, such that the $R_{2/f}O/SiO_2$ mole ratio is in the range of from about 0.5 to about 2.0.

(3) Agitate the mixture resulting from step (2) for from about 10 minutes to about 6 hours, preferably from about 30 minutes to about 2 hours, at a temperature of from about 0° C. to about 25° C., and a pH of less than 12. This step permits hydrolysis/polymerization to take place and the resultant mixture will appear cloudy.

(4) Crystallize the product from step (3) at a temperature of from about 25° C. to about 150° C., preferably about 95° C. to about 110° C., for from about 4 to about 72 hours, preferably from about 16 to about 48 hours.

In each of the above methods, batch crystallization of the crystalline material can be carried out under either static or agitated, e.g. stirred, conditions in a suitable reactor vessel, such as for example, polypropylene jars or teflon lined or stainless steel autoclaves. Crystallization may also be conducted continuously in suitable equipment. The total useful range of temperatures for crystallization is noted above for each method for a time sufficient for crystallization to occur at the temperature used, e.g. from about 5 minutes to about 14 days. The crystals are then separated from the liquid and recovered. Following the synthesis, the crystalline material should be subjected to treatment to remove part or all of any organic constituent.

When a source of silicon is used in the synthesis method, it is preferred to use at least in part an organic silicate, such as, for example, a quaternary ammonium silicate. Non-limiting examples of such a silicate include tetramethylammonium silicate and tetraethylorthosilicate.

By adjusting conditions of the synthesis reaction for each method, like temperature, pH and time of reaction, etc., within the above limits, various embodiments of the present non-layered crystalline material with a desired average pore size may be prepared. In particular, changing the pH, the temperature or the reaction time may promote formation of product crystals with different average pore size.

Non-limiting examples of various combinations of W, X, Y and Z contemplated for the first and second synthesis methods include:

| W  | X  | Y  | Z |
|----|----|----|---|
| —  | Al | Si | — |
| —  | Al | —  | P |
| —  | Al | Si | P |
| Co | Al | —  | P |
| Co | Al | Si | P |
| —  | —  | Si | — | including the combinations of W being Mg, or an element selected from the divalent first tow transition metals, e.g. Mn, Co and Fe; X being B, Ga or Fe; and Y being Ge.

An organic directing agent for use in each of the above methods for synthesizing the present material from the respective reaction mixtures is an ammonium or phosphonium ion of the formula $R_1R_2R_3R_4Q^+$, i.e.:

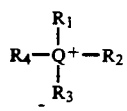

where Q is nitrogen or phosphorus and wherein at least one of $R_1$, $R_2$, $R_3$ and $R_4$ is aryl or alkyl of from 6 to about 36 carbon atoms, e.g., $-C_6H_{13}$, $-C_{10}H_{21}$, $-C_{16}H_{33}$ and $-C_{18}H_{37}$, or combinations thereof, the remainder of $R_1$, $R_2$, $R_3$ and $R_4$ being selected from hydrogen, alkyl of from 1 to 5 carbon atoms and combinations of these. The compound from which the above ammonium or phosphonium ion is derived may be, for example, the hydroxide, halide, silicate, or mixtures of these.

In the first and third methods above it is preferred to have an additional organic directing agent and in the second method it is required to have a combination of the above organic directing agent and an additional organic directing agent. That additional organic directing agent is the ammonium or phosphonium ion of the above directing agent formula wherein $R_1$, $R_2$, $R_3$ and $R_4$ together or separately are selected from the group consisting of hydrogen and alkyl of 1 to 5 carbon atoms and combinations thereof. Any such combination of organic directing agents go to make up "R" and will be in molar ratio of about 100/1 to about 0.01/1, first above listed organic directing agent/additional organic directing agent.

The particular effectiveness of the required directing agent, when compared with other such agents known to direct synthesis of one or more other crystal structures, is believed due to its ability to function as a template in the above reaction mixture in the nucleation and growth of the desired ultra-large pore crystals with the limitations discussed above. Non-limiting examples of these directing agents include cetyltrimethylammonium, cetyltrimethylphosphonium, benzyltrimethylammonium, cetylpyridinium, myristyltrimethylammonium, decyltrimethylammonium, dodecyltrimethylammonium and dimethyldidodecylammonium.

The reaction mixture components can be supplied by more than one source. The reaction mixture can be prepared either batchwise or continuously. Crystal size and crystallization time of the new crystalline material will vary with the nature of the reaction mixture employed and the crystallization conditions.

The crystals prepared by the synthesis procedure can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

The size of the pores in the present mesoporous catalytic materials is large enough that the spatiospecific selectivity with respect to transition state species in reactions such as cracking is minimized (Chen et al., "Shape Selective Catalysis in Industrial Applications", 36 CHEMICAL INDUSTRIES, pgs. 41-61 (1989) to which reference is made for a discussion of the factors affecting shape selectivity). Diffusional limitations are also minimized as a result of the very large pores. For these reasons, the present compositions are especially useful for catalyzing the hydrocracking reactions with high boiling feeds containing components with bulky molecular configurations.

The crystals of the mesoporous support material will normally be composited with a matrix material which is resistant to the temperatures and other conditions employed in the process applications in which the catalyst is to be used. Such materials include active and inactive materials and synthetic or naturally occurring zeolites as well as inorganic materials such as clays and/or oxides such as alumina, silica or silica-alumina. The latter may be either naturally occurring or in the form of gelatinous precipitates or gels including mixtures of silica and metal oxides. Use of a material in conjunction with the crystalline material, i.e., combined with it or present during its synthesis, which itself is catalytically active may change the conversion and/or selectivity of the catalyst. Inactive materials suitably serve as diluents to control the amount of conversion so that alkylation products can be obtained economically and orderly without employing other means for controlling the rate of reaction. These materials may be incorporated into naturally occurring clays, e.g., bentonite and kaolin, to improve the crush strength of the catalyst under commercial alkylation operating conditions and function as binders or matrices for the catalyst. The mesoporous material is usually composited with the matrix in amounts from 80:20 to 20:80 by weight, typically from 80:20 to 50:50 mesoporous material:matrix. Compositing may be done by conventional means including mulling the materials together followed by extrusion of pelletizing into the desired finished catalyst particles. Exchange of the metal into the crystalline material may take place before or after compositing with the binder but preferably is performed on the composited catalyst i.e. crystalline material plus binder. Impregnation will normally be carried out with the matrixed material. If the metal component is to be mixed with the other components of the catalyst, it may suitably be added to the muller with the crystalline material and the binder.

The catalyst may be treated by conventional pre-sulfiding treatments, e.g. by heating in the presence of hydrogen sulfide, to convert oxide forms of the metals such as CoO or NiO to their corresponding sulfides prior to use in typical hydroprocessing operations.

The properties of typical hydroprocessing catalysts made with the mesoporous support materials and a nickel-tungsten hydrogenation component on an MCM-41/Al$_2$O$_3$ support (65% MCM-41, 35% binder) are set out in Table 1 below in a comparison with conventional type amorphous hydroprocessing catalysts.

TABLE 1

| Properties of NiW Catalysts | | | | | | |
|---|---|---|---|---|---|---|
| | MCM-41 (40 Å) | | | Fluorided Amorphous | | |
| Nickel, wt % | 3.7 | 3.4 | 5.8[1] | 5.6 | 4.6 | 4.2 |
| Tungsten, wt % | 9.2 | 16.4 | 29.1[1] | 17.3 | 23.8 | 19.2 |
| Total metal, wt. % | 12.9 | 19.8 | 34.92 | 22.9 | 28.4 | 23.4 |
| Pore Diam., Å | 58 | 59 | | 95 | 74 | 162 |
| Pore Vol. cc/gm | 0.780 | 0.634 | | 0.426 | 0.453 | 0.507 |
| Part Dens, g/cc | 0.883 | 1.037 | | 1.454 | 1.451 | 1.345 |
| Real Dens, g/cc | 2.837 | 3.027 | | 4.023 | 4.238 | 4.236 |
| Surface Area, m$^2$ g$^{-1}$ | 533 | 429 | 242 | 116 | 170 | 125 |
| Calculated Tungsten* Monolayer Coverage, % | 0.25 | 0.51 | 1.32 | 1.4 | 1.35 | 1.46 |

*Tungsten trioxide surface area 24 Å as given in J. Cat., 79, 203, (1983).

Examples 1 to 19 below illustrate to preparation of the mesoporous crystalline materials used to prepare the catalysts. In these examples, the sorption data for water, cyclohexane, benzene and/or n-hexane, they are Equilibrium Adsorption values determined as follows:

A weighed sample of the adsorbent, after calcination at about 540° C. for at least about 1 hour and other treatment, if necessary, to remove any pore blocking contaminants, is contacted with the desired pure adsorbate vapor in an adsorption chamber. The increase in weight of the adsorbent is calculated based on adsorbent weight after calcination at about 540° C. The present composition exhibits an equilibrium benzene adsorption capacity at 50 Torr and 25° C. of greater than about 15 grams/100 grams, particularly greater than about 17.5 g/100 g/ and more particularly greater than about 20 g/100 g.

A preferred way to do this is to contact the desired pure adsorbate vapor in an adsorption chamber evacuated to less than 1 mm at conditions of 12 Torr of water vapor, 40 Torr of n-hexane or cyclohexane vapor, or 50 Torr of benzene vapor, at 25° C. The pressure is kept constant (within about ±0.5 mm) by addition of adsorbate vapor controlled by a manostat during the adsorption period. As adsorbate is adsorbed by the new crystal, the decrease in pressure causes the manostat to open a valve which admits more adsorbate vapor to the chamber to restore the above control pressures. Sorption is complete when the pressure change is not sufficient to activate the manostat.

Another way of doing this for benzene adsorption data is on a suitable thermogravimetric analysis system, such as a computer-controlled 990/951 duPont TGA system. The adsorbent sample is dehydrated (physically sorbed water removed) by heating at, for example, about 350° C. or 500° C. to constant weight in flowing helium. If the sample is in as-synthesized form, e.g. containing organic directing agents, it is calcined at about 540° C. in air and held to constant weight instead of the previously described 350° C. or 500° C. treatment. Benzene adsorption isotherms are measured at 25° C. by blending a benzene saturated helium gas stream with a pure helium gas stream in the proper proportions to obtain the desired benzene partial pressure. The value of the adsorption at 50 Torr of benzene is taken from a plot of the adsorption isotherm.

In the examples, percentages are by weight unless otherwise indicated.

EXAMPLE 1

One hundred grams of cetyltrimethylammonium (CTMA) hydroxide solution, prepared by contacting a 29 wt. % N,N,N- trimethyl-1-hexadecanaminium chloride solution with a hydroxide-for-halide exchange resin, was combined with 100 grams of an aqueous solution of tetramethylammonium (TMA) silicate (10% silica) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a polypropylene bottle, which was placed in a steam box at 95° C. overnight. The mixture had a composition in terms of moles per mole Al$_2$O$_3$:

| |
|---|
| 2.7 moles Na$_2$O |
| 392 moles SiO$_2$ |
| 35.7 moles (CTMA)$_2$O |
| 61.7 moles (TMA)$_2$O |
| 6231 moles H$_2$O |

The resulting solid product was recovered by filtration and dried in air at ambient temperature. The product was then calcined at 540° C. for 1 hour in nitrogen, followed by 6 hours in air.

The calcined product proved to have a surface area of 475 m$^2$/g and the following equilibrium adsorption capacities in grams/100 grams:

| | |
|---|---|
| H$_2$O | 8.3 |
| Cyclohexane | 22.9 |
| n-Hexane | 18.2 |
| Benzene | 21.5 |

The product of this example may be characterized by X-ray diffraction as including a very strong relative intensity line at 37.8±2.0 Å d-spacing, and weak lines at 21.6±1.0 and 19.2±1.0 Å. Transmission electron microscopy (TEM) produced images of a hexagonal arrangement of uniform pores and hexagonal electron diffraction pattern with a $d_{100}$ value of about 39 Å.

EXAMPLE 2

One hundred grams of cetyltrimethylammonium (CTMA) hydroxide solution prepared as in Example 1 was combined with 100 grams of an aqueous solution of tetramethylammonium (TMA) hydroxide (25%) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a static autoclave at 150° C. overnight. The mixture has a composition in terms of moles per mole $Al_2O_3$:

| |
|---|
| 2.7 moles $Na_2O$ |
| 291 moles $SiO_2$ |
| 35.7 moles $(CTMA)_2O$ |
| 102 moles $(TMA)_2O$ |
| 6120 moles $H_2O$ |

The resulting solid product was recovered by filtration and dried in air at ambient temperature. The product was then calcined at 540° C. for 1 hour in nitrogen, followed by 6 hours in air.

The calcined product proved to have a surface area of 993 m²/g and the following equilibrium adsorption capacities in grams/100 grams:

| | |
|---|---|
| $H_2O$ | 7.1 |
| Cyclohexane | 47.2 |
| n-Hexane | 36.2 |
| Benzene | 49.5 |

The X-ray diffraction pattern of the calcined product may be characterized as including a very strong relative intensity line at 39.3±2.0 Å d-spacing, and weak lines at 22.2±1.0 and 19.4±1.0 Å. TEM indicated that the product contained the ultra-large pore material.

A portion of the above product was then contacted with 100% steam at 1450° F. for two hours. The surface area of the steamed material was measured to be 440 m²/g, indicating that about 45% was retained following severe steaming.

Another portion of the calcined product of this example was contacted with 100% steam at 1250° F. for two hours. The surface area of this material was measured to be 718 m²/g, indicating that 72% was retained after steaming at these conditions.

EXAMPLE 3

Water, cetyltrimethylammonium hydroxide solution prepared as in Example 1, aluminum sulfate, HiSil and an aqueous solution of tetrapropylammonium (TPA) bromide (35%) were combined to produce a mixture having a composition in terms of moles per mole $Al_2O_3$:

| |
|---|
| 0.65 moles $Na_2O$ |
| 65 moles $SiO_2$ |
| 8.8 moles $(CTMA)_2O$ |
| 1.22 moles $(TPA)_2O$ |
| 1336 moles $H_2O$ |

The resulting mixture was placed in a polypropylene bottle, which was kept in a steam box at 95° C. for 192 hours. The sample was then cooled to room temperature and combined with CTMA hydroxide solution prepared as in Example 1 and TMA hydroxide (25% by weight) in the weight ratio of 3 parts mixture, 1 part CTMA hydroxide and 2 parts TMA hydroxide. The combined mixture was then placed in a polypropylene bottle and kept in a steam box at 95° C. overnight. The combined mixture had a composition in terms of moles per mole $Al_2O_3$:

| |
|---|
| 0.65 moles $Na_2O$ |
| 65 moles $SiO_2$ |
| 15 moles $(CTMA)_2O$ |
| 1.22 moles $(TPA)_2O$ |
| 35.6 moles $(TMA)_2O$ |
| 2927 moles $H_2O$ |

The resulting solid product was recovered by filtration and dried in air at ambient temperature. The product was then calcined at 540° C. for 1 hour in nitrogen, followed by 6 hours in air.

The calcined product proved to have a surface area of 1085 m²/g and the following equilibrium adsorption capacities in grams/100 grams:

| | |
|---|---|
| $H_2O$ | 11.5 |
| Cyclohexane | >50 |
| n-Hexane | 39.8 |
| Benzene | 62 |

The X-ray diffraction pattern of the calcined product of this example may be characterized as including a very strong relative intensity line at 38.2±2.0 Å d-spacing, and weak lines at 22.2±1.0 and 19.4±1.0 Å. TEM indicated the product contained the ultra-large pore material.

EXAMPLE 4

Two hundred grams of cetyltrimethylammonium (CTMA) hydroxide solution prepared as in Example 1 was combined with 2 grams of Catapal alumina (alpha-alumina monohydrate, 74% alumina) and 100 grams of an aqueous solution of tetramethylammonium (TMA) silicate (10% silica) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a state autoclave at 150° C. for 48 hours. The mixture had a composition in terms of moles per mole $Al_2O_3$:

| |
|---|
| 0.23 moles $Na_2O$ |
| 33.2 moles $SiO_2$ |
| 6.1 moles $(CTMA)_2O$ |
| 5.2 moles $(TMA)_2O$ |
| 780 moles $H_2O$ |

The resulting solid product was recovered by filtration and dried in air at ambient temperature. The product was then calcined at 650° C. for 1 hour in nitrogen, followed by 6 hour in air.

The calcined product proved to have a surface area of 1043 m²/g and the following equilibrium adsorption capacities in grams/100 grams:

|  |  |
|---|---|
| H₂O | 6.3 |
| Cyclohexane | >50 |
| n-Hexane | 49.1 |
| Benzene | 66.7 |

The X-ray diffraction pattern of the calcined product may be characterized as including a very strong relative intensity line at 40.8±2.0 Å d-spacing, and weak lines at 23.1±1.0 and 20.1±1.0 Å. TEM indicated that the product contained the ultra-large pore material.

EXAMPLE 5

Two-hundred sixty grams of water was combined with 77 grams of phosphoric acid (85%), 46 grams of Catapal alumina (74% alumina), and 24 grams of pyrrolidine (Pyr) with stirring. This first mixture was placed in a stirred autoclave and heated to 150° C. for six days. The material was filtered, washed and air-dried. Fifty grams of this product was slurried with 200 grams of water and 200 grams of cetyltrimethylammonium hydroxide solution prepared as in Example 1. Four hundred grams of an aqueous solution of tetraethylammonium silicate (10% silica) was then added to form a second mixture which was placed in a polypropylene bottle and kept in a steam box at 95° C. overnight. The first mixture had a composition in terms of moles per mole Al₂O₃:

|  |  |
|---|---|
| 1.0 moles P₂O₅ | |
| 0.51 moles (Pyr)₂O | |
| 47.2 moles H₂O | |

The resulting solid product was recovered by filtration and dried in air at ambient temperature. The product was then calcined at 540° for 1 hour in nitrogen, followed by 6 hours in air.

The calcined product proved to have a surface area of 707 m²/ and the following equilibrium adsorption capacities in grams/100 grams:

|  |  |
|---|---|
| H₂O | 33.2 |
| Cyclohexane | 19.7 |
| n-Hexane | 20.1 |
| Benzene | 23.3 |

The X-ray diffraction pattern of the calcined product may be characterized as including a very strong relative intensity line at 25.4±1.5 Å d-spacing. TEM indicated the product contained the present ultra-large pore material.

EXAMPLE 6

A solution of 1.35 grams of NaAlO₂ (43.5% Al₂O₃, 30% Na₂O) dissolved in 45.2 grams of water was mixed with 17.3 grams of NaOH, 125.3 grams of colloidal silica (40%, Ludox HS-40) and 42.6 grams of 40% aqueous solution of tetraethylammonium (TEA) hydroxide. After stirring overnight, the mixture was heated for 7 days in a steam box (95° C.). Following filtration, 151 grams of this solution was mixed with 31 grams of cetyltrimethylammonium hydroxide solution prepared as in Example 1 and stored in the steam box at 95° C. for 13 days. The mixture had the following relative molar composition:

|  |  |
|---|---|
| 0.25 moles Al₂O₃ | |
| 10 moles Na₂O | |
| 36 moles SiO₂ | |
| 0.95 moles (CTMA)₂O | |
| 2.5 moles (TEA)₂O | |
| 445 moles H₂O | |

The resulting solid product was recovered and washed with water and ethanol. The product was then calcined at 540° C. for 1 hour in nitrogen, followed by 6 hours in air.

The calcined product composition included 0.14 wt. % Na, 68.5 wt. % SiO₂ and 5.1 wt. % Al₂O₃, and proved to have a benzene equilibrium adsorption capacity of 58.6 grams/100 grams.

The X-ray diffraction pattern of the calcined product may be characterized as including a very strong relative intensity line at 31.4±1.5 Å d-spacing. TEM indicated that the product contained the present ultra-large pore material.

EXAMPLE 7

A mixture of 300 grams of cetyltrimethylammonium (CTMA) hydroxide solution prepared as in Example 1 and 41 grams of colloidal silica (40%, Ludox HS-40) was heated in a 600 cc autoclave at 150° C. for 48 hours with stirring at 200 rpm. The mixture has a composition in terms of moles per mole SiO₂:

|  |  |
|---|---|
| 0.5 mole (CTMA)₂O | |
| 46.5 moles H₂O | |

The resulting solid product was recovered by filtration, washed with water, then calcined at 540° C. for 1 hour in nitrogen, followed by 10 hours in air.

The calcined product composition included less than 0.01 wt. % Na, about 98.7 wt. % SiO₂ and about 0.01 wt. % Al₂O₃, and proved to have a surface area of 896 m²/g. The calcined product had the following equilibrium adsorption capacities in grams/100 grams:

|  |  |
|---|---|
| H₂O | 8.4 |
| Cyclohexane | 49.8 |
| n-Hexane | 42.3 |
| Benzene | 55.7 |

The X-ray diffraction pattern of the calcined product of this example may be characterized as including a very strong relative intensity line at 40.0±2.0 Å d-spacing and a weak line at 21.2±1.0 Å. TEM indicated that the product of this example contained at least three separate phases, one of which was the ultra-large pore material.

EXAMPLE 8

A mixture of 150 grams of cetyltrimethylammonium (CTMA) hydroxide solution prepared as in Example 1 and 21 grams of colloidal silica (40%, Ludox HS-40) with an initial pH of 12.64 was heated in a 300 cc autoclave at 150° C. for 48 hours with stirring at 200 rpm. The mixture had a composition in terms of moles per mole SiO₂:

0.5 mole (CTMA)$_2$O
46.5 moels H$_2$O

The resulting solid product was recovered by filtration, washed with water, then calcined at 540° C. for 6 hours in air.

The calcined product composition was measured to include 0.01 wt. % Na, 93.2 wt. % SiO$_2$ and 0.016 wt. % Al$_2$O$_3$, and proved to have a surface area of 992 m$^2$g and the following equilibrium adsorption capacities in grams/100 grams:

| | |
|---|---|
| H$_2$O | 4.6 |
| Cyclohexane | >50 |
| n-Hexane | >50 |
| Benzene | 62.7 |

The X-ray diffraction pattern of the calcined product may be characterized as including a very strong relative intensity line at 43.6±2.0 Å d-spacing and weak lines at 25.1±1.5 and 21.7±1.0 Å. TEM indicated that the product contained the ultra-large pore material.

EXAMPLE 9

Sodium aluminate (4.15 g) was added slowly into a solution containing 16 g of myristyltrimethylammonium bromide (C$_{14}$TMABr) in 100 g of water. Tetramethylammonium silicate (100 g-10% SiO$_2$), HiSil (25 g) and tetramethylammonium hydroxide (14.2 g-25% solution) were then added to the mixture. The mixture was crystallized in an autoclave at 120° C. with stirring for 24 hours.

The product was filtered, washed and air dried. Elemental analysis showed the product contained 53.3 wt % SiO$_2$, 3.2 wt % Al$_2$O$_3$, 15.0 wt % C, 1.88 wt % N, 0.11 wt % Na and 53.5 wt % ash at 1000° C. The X-ray diffraction pattern of the material after calcination at 540° C. for 1 hour in N$_2$ for 6 hours in air includes a very strong relative intensity line at 35.3±2.0 Å d-spacing and weak lines at 20.4±1.0 and 17.7±1.0 Å d-spacing. TEM indicated that the product contained the ultra-large pore material.

The washed product, having been exchanged with 1N ammonium nitrate solution at room temperature, then calcined, proved to have a surface area of 827 m$^2$/g and the following equilibrium adsorption capacities in g/100 g anhydrous sorbent:

| | |
|---|---|
| H$_2$O | 30.8 |
| Cyclohexane | 33.0 |
| n-Hexane | 27.9 |
| Benzene | 40.7 |

EXAMPLE 10

Sodium aluminate (8.3 g) was added slowly into a solution containing 184 g of dodecyltrimethylammonium hydroxide (C$_{12}$TMAOH, 50%) solution diluted with 480 g of water. UltraSil (50 g) and an aqueous solution of tetramethylammonium silicate (200 g-10% SiO$_2$) and tetramethylammonium hydroxide (26.38 g-25% solution) were then added to the mixture. The mixture was crystallized in an autoclave at 100° C. with stirring for 24 hours.

The product was filtered, washed and air dried. After calcination at 540° C. for 1 hour in N$_2$ and 6 hours in air, the X-ray diffraction pattern includes a very strong relative intensity line at 30.4±1.5 Å d-spacing and weak lines at 17.7±1.0 and 15.3±1.0 Å d-spacing. TEM indicated that the product contained the ultra-large pore material.

The washed product, having been exchanged with 1N ammonium nitrate solution at room temperature, then calcined, proved to have a surface area of 1078 m$^2$/g and the following equilibrium adsorption capacities in g/100 g anhydrous sorbent:

| | |
|---|---|
| H$_2$O | 32.6 |
| Cyclohexane | 38.1 |
| n-Hexane | 33.3 |
| Benzene | 42.9 |

EXAMPLE 11

A solution of 4.9 grams of NaAlO$_2$ (43.5% Al$_2$O$_3$, 30% NaO$_2$) in 37.5 grams of water was mixed with 46.3 cc of 40% aqueous, tetraethylammonium hydroxide solution and 96 grams of colloidal silica (40%, Ludox HS-40). The gel was stirred vigorously for 0.5 hour, mixed with an equal volume (150 ml) of cetyltrimethylammonium hydroxide solution prepared as in Example 1 and reacted at 100° C. for 168 hours. The mixture had the following composition in terms of moles per mole Al$_2$O$_3$:

| |
|---|
| 1.1 moles Na$_2$O |
| 30.6 moles SiO$_2$ |
| 3.25 moles (CTMA)$_2$O |
| 609 moles H$_2$O |

The resulting solid product was recovered by filtration, washed with water then calcined at 540° C. for 16 hours in air. The calcined product proved to have a surface area of 1352 m$^2$/g and the following equilibrium adsorption capacities in grams/100 grams:

| | |
|---|---|
| H$_2$O | 23.6 |
| Cyclohexane | >50 |
| n-Hexane | 49 |
| Benzene | 67.5 |

The X-ray diffraction pattern of the calcined product may be characterized as including a very strong relative intensity line at 38.5±2.0 Å d-spacing and a weak line at 20.3±1.0 Å. TEM indicated that the product contained the ultra-large pore material.

EXAMPLE 12

Two hundred grams of cetyltrimethylammonium (CTMA) hydroxide solution prepared as in Example 1 was combined with 4.15 grams of sodium aluminate and 100 grams of aqueous tetramethylammonium (TMA) silicate solution (10% silica) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a static autoclave at 150° C. for 24 hours. The mixture had a composition in terms of moles per mole Al$_2$O$_3$:

| | |
|---|---|
| 1.25 moles Na$_2$O | |
| 27.8 moles SiO$_2$ | |
| 5.1 moles (CTMA)$_2$O | |
| 4.40 moles (TMA)$_2$O | |
| 650 moles H$_2$O | |

The resulting solid product was recovered by filtration and dried in air at ambient temperature. The product was then calcined at 540° C. for 1 hour in nitrogen, followed by 6 hours in air. TEM indicated that this product contained the ultra-large pore material. The X-ray diffraction pattern of the calcined product of this example can be characterized as including a very strong relative intensity line at 44.2±2.0 Å d-spacing and weak lines at 25.2±1.5 and 22.0±1.0 Å.

The calcined product proved to have a surface area of 932 m$^2$/g and the following equilibrium adsorption capacities in grams/100 grams:

| | |
|---|---|
| H$_2$O | 39.3 |
| Cyclohexane | 46.6 |
| n-Hexane | 37.5 |
| Benzene | 50 |

EXAMPLE 13

Two hundred grams of cetyltrimethylammonium (CTMA) hydroxide solution prepared as in Example 1 was combined with 4.15 grams of sodium aluminate and 100 grams of aqueous tetramethylammonium (TMA) silicate solution (10% silica) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a static autoclave at 100° C. for 48 hours. The mixture had a composition in terms of moles per mole Al$_2$O$_3$:

| | |
|---|---|
| 1.25 moles Na$_2$O | |
| 27.8 moles SiO$_2$ | |
| 5.1 moles (CTMA)$_2$O | |
| 4.4 moles (TMA)$_2$O | |
| 650 moles H$_2$O | |

The resulting solid product was recovered by filtration and dried in air at ambient temperature. The product was then calcined at 540° C. for 1 hour in nitrogen, followed by 6 hours in air. The calcined product proved to have the following equilibrium adsorption capacities in grams/100 grams:

| | |
|---|---|
| H$_2$O | 35.2 |
| Cyclohexane | >50 |
| n-Hexane | 40.8 |
| Benzene | 53.5 |

The X-ray diffraction pattern of the calcined product may be characterized as including a very strong relative intensity line at 39.1±2.0 Å d-spacing and weak lines at 22.4±1.0 and 19.4±1.0 Å. TEM indicated that this product contained the ultra-large pore material.

EXAMPLE 14

A mixture of 125 grams of 29% CTMA chloride aqueous solution, 200 grams of water, 3 grams of sodium aluminate (in 50 grams H$_2$O), 65 grams of Ultrasil, amorphous precipitated silica available from PQ Corporation, and 21 grams NaOH (in 50 grams H$_2$O) was stirred thoroughly and crystallized at 150° C. for 168 hours. The reaction mixture had the following relative molar composition in terms of moles per mole silica:

| | |
|---|---|
| 0.10 moles (CTMA)$_2$O | |
| 21.89 moles H$_2$O | |
| 0.036 moles NaAlO$_2$ | |
| 0.53 moles NaOH | |

The solid product was isolated by filtration, washed with water, dried for 16 hours at room temperature and calcined at 540° C. for 10 hours in air. The calcined product proved to have a surface area of 840 m$^2$/g, and the following equilibrium adsorption capacities in grams/100 grams:

| | |
|---|---|
| H$_2$O | 15.2 |
| Cyclohexane | 42.0 |
| n-Hexane | 26.5 |
| Benzene | 62 |

The X-ray diffraction pattern of the calcined product may be characterized as including a very strong relative intensity line at 40.5±2.0 Å d-spacing. TEM indicated that the product contained the ultra-large pore material.

EXAMPLE 15

To make the primary template mixture for this example, 240 grams of water was added to a 92 gram solution of 50% dodecyltrimethylammonium hydroxide, 36% isopropyl alcohol and 14% water such that the mole ratio of Solvent/R$_{2/f}$O was 155. The mole ratio of H$_2$O/R$_{2/f}$O in this mixture was 149 and the IPA/R$_{2/f}$O mole ratio was 6. To the primary template mixture was added 4.15 grams of sodium aluminate, 25 grams of HiSil, 100 grams of aqueous tetramethylammonium silicate solution (10% SiO$_2$) and 13.2 grams of 25% aqueous tetramethylammonium hydroxide solution. The mole ratio of R$_{2/f}$O(SiO$_2$+Al$_2$O$_3$) was 0.28 for the mixture.

This mixture was stirred at 25° C., for 1 hour. The resulting mixture was then placed in an autoclave at 100° C. and stirred at 100 rpm for 24 hours. The mixture in the autoclave had the following relative molar composition in terms of moles per mole SiO$_2$:

| | |
|---|---|
| 0.05 mole Na$_2$O | |
| 0.036 mole Al$_2$O$_3$ | |
| 0.18 mole (C$_{12}$TMA)$_2$O | |
| 0.12 mole (TMA)$_2$O | |
| 36.0 moles H$_2$O | |
| 1.0 mole IPA | |

The resulting solid product was recovered by filtration, washed with water and dried in air at ambient temperature. The product was then calcined at 540° C. for 1 hour in nitrogen, followed by 6 hours in air.

The calcined product provided to have a surface area of 1223 m$^2$/g and the following equilibrium adsorption capacities in grams/100 grams:

| | |
|---|---|
| H$_2$O | 25.5 |
| Cyclohexane | 41.1 |

| | |
|---|---|
| n-Hexane | 35.1 |
| Benzene | 51 |

The X-ray diffraction pattern of the calcined product may be characterized as including a very strong relative intensity line at 30.8±1.5 Å d-spacing and weak lines at 17.9±1.0 and 15.5±1.0 Å. TEM indicated this product to contain the ultra-large pore material.

EXAMPLE 16

A 50.75 gram quantity of decyltrimethylammonium hydroxide (prepared by contacting a ca. 29 wt. % solution of decyltrimethylammonium bromide with a hydroxide-for-halide exchange resin) was combined with 8.75 grams of tetraethylorthosilicate. The mixture was stirred for about 1 hour and then transferred to a polypropylene jar which was then placed in a steambox for about 24 hours. The mixture had a composition in terms of moles per mole $SiO_2$:

| | |
|---|---|
| 0.81 mole | $(C_{10}TMA)_2O$ |
| 47.6 moles | $H_2O$ |

The resulting solid product was filtered and washed several times with warm (60°-70° C.) distilled water and with acetone. The final product was calcined to 538° C. in $N_2$/air mixture and then held in air for about 8 hours. The calcined product proved to have a surface area of 915 m²/g and an equilibrium benzene adsorption capacity of 35 grams/100 grams. Argon physisorption data indicated an argon uptake of 0.34 cc/gram, and a pore size of 15 Å.

The X-ray diffraction pattern of the calcined product of this example may be characterized as including a very strong relative intensity line at 27.5±1.5 Å d-spacing and weak lines at 15.8±1.0 and 13.7±1.0 Å. TEM indicated that the product of this example contained the ultra-large pore material.

EXAMPLE 17

To eighty grams of cetyltrimethylammonium hydroxide (CTMAOH) solution prepared as in Example 1 was added 1.65 grams of $NaAlO_2$. The mixture was stirred at room temperature until the $NaAlO_2$ was dissolved. To this solution was added 40 grams of aqueous tetramethylammonium (TMA) silicate solution (10 wt. % $SiO_2$), 10 grams of HiSil, 200 grams of water and 70 grams of 1,3,5-trimethylbenzene (mesitylene). The resulting mixture was stirred at room temperature for several minutes. The gel was then loaded into a 600 cc autoclave and heated at 105° C. for sixty-eight hours with stirring at 150 rpm. The mixture had a composition in terms of moles per mole $Al_2O_3$:

| | |
|---|---|
| 1.25 moles | $Na_2O$ |
| 27.8 moles | $SiO_2$ |
| 5.1 moles | $(CTMA)_2O$ |
| 2.24 moles | $(TMA)_2O$ |
| 2256 moles | $H_2O$ |
| 80.53 moles | 1,3,5-trimethylbenzene |

The resulting product was filtered and washed several times with warm (60°-70° C.) distilled water and with acetone. The final product was calcined to 538° C. in $N_2$/air mixture and then held in air for about 10 hours. The calcined product proved to have an equilibrium benzene adsorption capacity of >25 grams/100 grams.

The X-ray diffraction pattern of the calcined product may be characterized as including a broad, very strong relative intensity line at about 102 Å d-spacing, but accurate positions of lines in the extreme low angle region of the X-ray diffraction pattern are very difficult to determine with conventional X-ray diffractometers. Furthermore, finer collimating slits were required to resolve a peak at this low 2-theta angle. The slits used in this example, starting at the X-ray tube, were 0.1, 0.3, 0.5 and 0.2 mm, respectively. TEM indicated that the product of this example contained several materials with different $d_{100}$ values as observed in their electron diffraction patterns. These materials were found to possess $d_{100}$ values between about 85 Å d-spacing and about 120 Å d-spacing.

EXAMPLE 18

To eighty grams of cetyltrimethylammonium hydroxide (CTMAOH) solution prepared as in Example 1 was added 1.65 grams of $NaAlO_2$. The mixture was stirred at room temperature until the $NaAlO_2$ was dissolved. To this solution was added 40 grams of aqueous tetramethylammonium (TMA) silicate solution (10 wt. % $SiO_2$), 10 grams of HiSil, 200 grams of water and 120 grams of 1,3,5-trimethylbenzene (mesitylene). The resulting mixture was stirred at room temperature for several minutes. The gel was then loaded into a 600 cc autoclave and heated at 105° C. for ninety hours with stirring at 150 rpm. The mixture had a composition in terms of moles per mole $Al_2O_3$:

| | |
|---|---|
| 1.25 moles | $Na_2O$ |
| 27.8 moles | $SiO_2$ |
| 5.1 moles | $(CTMA)_2O$ |
| 2.24 moles | $(TMA)_2O$ |
| 2256 moles | $H_2O$ |
| 132.7 moles | 1,3,5-trimethylbenzene |

The resulting product was filtered and washed several times with warm (60°-70° C.) distilled water and with acetone. The final product was calcined to 538° C. in $N_2$/air mixture and then held in air for about 10 hours. The calcined product proved to have a surface area of 915 m²/g and an equilbrium benzene adsorption capacity of >25 grams/100 grams. Argon physisorption data indicated an argon uptake of 0.95 cc/gram, and a pore size centered on 78 Å (Dollimore-Heal Method, see Example 22(b)), but running from 70 to greater than 105 Angstoms. The X-ray diffraction pattern of the calcined product of this example may be characterized as having only enhanced scattered intensity in the very low angle region of the X-ray diffraction, where intensity from the transmitted incident X-ray beam is usually observed. However, TEM indicated that the product contained several materials with different $d_{100}$ values as observed in their electron diffraction patterns. These materials were found to possess $d_{100}$ values between about 85 Å d-spacing and about 110 Å d-spacing.

EXAMPLE 19

To eighty grams of cetyltrimethylammonium hydroxide (CTMAOH) solution prepared as in Example 1 was added 1.65 grams of $NaAlO_2$. The mixture was stirred at room temperature until the $NaAlO_2$ was dissolved. To this solution was added 40 grams of aqueous tetramethylammonium (TMA) silicate solution (10 wt. % $SiO_2$), 10 grams of HiSil, and 18 grams of 1,3,5-trimethylbenzene (mesitylene). The resulting mixture was stirred at room temperature for several minutes. The gel was then loaded into a 300 cc autoclave and heated at 105° C. for four hours with stirring at 150 rpm. The mixture had a composition in terms of moles per mole $Al_2O_3$:

| | |
|---|---|
| 1.25 moles | $Na_2O$ |
| 27.8 moles | $SiO_2$ |
| 5.1 moles | $(CTMA)_2O$ |
| 2.24 moles | $(TMA)_2O$ |
| 650 moles | $H_2O$ |
| 19.9 moles | 1,3,5-trimethylbenzene |

The resulting product was filtered and washed several times with warm (60°-70° C.) distilled water and with acetone. The final product was calcined to 538° C. in $N_2$/air mixture and then held in air for about 8 hours.

The calcined product proved to have a surface area of 975 $m^2/g$ and an equilbrium benzene adsorption capacity of >40 grams/100 grams. Argon physisorption data indicated an argon uptake of 0.97 cc/gram, and a pore size of 63 Å (Dollimore-Heal Method), with the peak occurring at $P/P_o = 0.65$.

The X-ray diffraction pattern of the calcined product of this example may be characterized as including a very strong relative intensity line at 63±5 Å d-spacing and weak lines at 36.4±2.0, 31.3±1.5 Å and 23.8±1.0 Å d-spacing. TEM indicated that the product of this example contained the ultra-large pore material.

EXAMPLE 20

Argon Physisorption Determination

To determine the pore diameters of the mesoporous products with pores up to about 60 Å in diameter, 0.2 gram samples of the products of Examples 1 through 17 were placed in glass sample tubes and attached to a physisorption apparatus as described in U.S. Pat. No. 4,762,010.

The samples were heated to 300° C. for 3 hours in vacuo to remove adsorbed water. Thereafter, the samples were cooled to 87°K by immersion of the sample tubes in liquid argon. Metered amounts of gaseous argon were then admitted to the samples in stepwise manner as described in U.S. Pat. No. 4,762,010, column 20. From the amount of argon admitted to the samples and the amount of argon left in the gas space above the samples, the amount of argon adsorbed can be calculated. For this calculation, the ideal gas law and the calibrated sample volumes were used. (See also S. J. Gregg et al., *Adsorption, Surface Area and Porosity*, 2nd ed., Academic Press, 1982). In each instance, a graph of the amount adsorbed versus the relative pressure above the sample, at equilibrium, constitutes the adsorption isotherm. It is common to use relative pressures which are obtained by forming the ratio of the equilibrium pressure and the vapor pressure $P_o$ of the adsorbate at the temperature where the isotherm is measured. Sufficiently small amounts of argon were admitted in each step to generate 168 data points in the relative pressure range from 0 to 0.6. At least about 100 points are required to define the isotherm with sufficient detail.

The step (inflection) in the isotherm, indicates filling of a pore system. The size of the step indicates the amount adsorbed, whereas the position of the step in terms of $P/P_o$ reflects the size of the pores in which the adsorption takes place. Larger pores are filled at high $P/P_o$. In order to better locate the position of the step in the isotherm, the derivative with respect to log ($P/P_o$) is formed. The adsorption peak (stated in terms of log ($P/P_o$)) may be related to the physical pore diameter (Å) by the following formula:

$$\log(P/P_o) = \frac{K}{d - 0.38}\left[\frac{S^4}{3(L - D/2)^3} - \frac{S^{10}}{9(L - D/2)^9} - \frac{S^4}{3(D/2)^3} + \frac{S^{10}}{9(D/2)^9}\right]$$

where d=pore diameter in nanometers, K=32.17, S=0.2446, L=d+0.19, and D=0.57.

This formula is derived from the method of Horvath and Kawazoe (G. Horvath et al., *J. Chem. Eng. Japan*, 16 (6) 470(1983)). The constants required for the implementation of this formula were determined from a measured isotherm of ALPO-5 and its known pore size. This method is particularly useful for microporous materials having pores of up to about 60 Å in diameter.

The results of this procedure for the samples from Examples 1 through 17 are tabulated below. The samples from Examples 10, 13 and 15 gave two separate peaks, believed to be the result of two separate ultra-large pore phases in the products.

| Example | Pore Diameter, Å |
|---|---|
| 1 | 32.2 |
| 2 | 35.4 |
| 3 | 42.5 |
| 4 | 39.6 |
| 5 | 16.9 |
| 6 | 27.3 |
| 7 | 36.6 |
| 8 | 42.6 |
| 9 | 28.3 |
| 10 | 22.8, 30.8 |
| 11 | 36.8 |
| 12 | 36.1 |
| 13 | 35.0, 42.1 |
| 14 | 40.0 |
| 15 | 22.4, 30.4 |
| 16 | 15.0 |

The above method of Horvath and Kawazoe for determining pore size from physisorption isotherms was intended to be applied to pore systems of up to 20 Å diameter; but with some care as above detailed, its use can be extended to pores of up to 60 Å diameter.

In the pore regime above 60 Å diameter, the Kelvin equation can be applied. It is usually given as:

$$\ln(P/P_o) = \frac{-2\gamma V}{r_k RT}\cos\theta$$

where:

$\gamma$ = surface tension of sorbate

V = molar volume of sorbate $\theta$ = contact angle (usually taken for practical reasons to be 0)

R = gas constant

T = absolute temperature $r_k$ = capillary condensate (pore) radius $P/P_o$ = relative pressure (taken from the physisorption isotherm)

The Kelvin equation treats adsorption in pores systems as a capillary condensation phenomenon and relates the pressure at which adsorption takes place to the pore diameter through the surface tension and contact angle of the adsorbate (in this case, argon). The principles upon which the Kelvin equation are based are valid for pores in the size range 50 to 1000 Angstrom diameter. Below this range the equation no longer reflects physical reality, since true capillary condensation cannot occur in smaller pores; above this range the logarithmic nature of the equation precludes obtaining sufficient accuracy for pore size determination.

The particular implementation of the Kelvin equation often chosen for measurement of pore size is that reported by Dollimore and Heal (D. Dollimore and G. R. Heal, J. Applied Chem, 14, 108 (1964). This method corrects for the effects of the surface layer of adsorbate on the pore wall, of which the Kelvin equation proper does not take account, and thus provides a more accurate measurement of pore diameter. While the method of Dollimore and Heal was derived for use on desorption isotherms, it can be applied equally well to adsorption isotherms by simply inverting the data set.

In order to illuminate the microstructure of the materials by transmission electromicroscopy (TEM), samples must be thin enough for an electron beam to pass through them, generally about 500–1000 Å or so thick. The crystal morphology of the present materials usually required that they be prepared for study by ultramicrotomy. While time consuming, this technique of sample preparation is conventional. The materials are embedded in a resin, in this case a commercially available low viscosity acrylic resin L. R. WHITE (hard), which is then cured at about 80° C. for about 1½ hours. Thin sections of the block are cut on an ultramicrotome using a diamond knife and sections in the thickness range 500–1000 Å are collected on fine mesh electron microscope support grids. For these materials, an LKB model microtome with a 45° C. diamond knife edge was used; the support grids were 400 mesh copper grids. After evaporation of a thin carbon coating on the sample to prevent charging in the microscope (light gray color on a while sheet of paper next to the sample in the evaporator), the samples are ready for examination in the TEM.

High resolution TEM micrographs show projections of structure along the direction that the sample is viewed. For this reason, it is necessary to have a sample in specific orientations to see certain details of the microstructure of the material. For crystalline materials, these orientations are most easily chosen by observing the electron diffraction pattern (EDP) that is produced simultaneously with the electron microscope image. Such EDPs are readily produced on modern TEM instruments using, e.g. the selected area field limiting aperture technique familiar to those skilled in the art of electron microscopy. When an EDP with the desired arrangement of diffraction spots is observed, the corresponding image of the crystal giving that EDP will reveal details of the microstructure along the direction of projection indicated by the EDP. In this way, different projections of a crystal's structure can be observed and identified using TEM.

In order to observe the salient features of the crystalline product of the present invention, it is necessary to view the material in an orientation wherein the corresponding EDP gives a hexagonal arrangement of diffraction spots from a single individual crystal. If multiple crystals are present within the field limiting aperture, overlapping diffraction patterns will occur that can be quite difficult to interpret. The number of diffraction spots observed depends to a degree upon the regularity of the crystalline arrangement in the material, among other things. At the very least the inner ring of bright spots should be observed to obtain a good image. Individual crystals can be manipulated by specimen tilt adjustments on the TEM until this orientation is achieved. More often, it is easier to take advantage of the fact that the specimen contains many randomly oriented crystals and to simply search through the sample until a crystal giving the desired EDP (and hence orientation) is located.

Microtomed samples of materials from the Examples were examined by the techniques described above in a JEOL 200 CX transmission electron microscope operated at 200,000 volts with an effective 2 Å objective aperture in place. The instrument has a point-to-point resolution of 4.5 Å. Other conventional experimental arrangements in high resolution (phase contrast) TEM could be used to produce equivalent images provided care is taken to keep the objective lens on the underfocus (weak leans) side of the minimum contrast lens current setting.

EXAMPLE 21

This Example provides a comparison with a zeolite catalyst (NiW/USY), using a heavy neutral distillate whose properties are given in Table 2 below, together with the properties of the oil after solvent dewaxing to 0° F. pour point. It can be seen that the feedstock has high nitrogen content of 1500 ppm and that the distillate VI after solvent dewaxing is 53. The objective of lube hydrocracking the distillate is to increase the VI level to the 95–100 VI range after solvent dewaxing while maximizing lube yield.

TABLE 2

| Heavy Neutral Distillate Properties | |
|---|---|
| Hydrogen, wt % | 12.83 |
| Nitrogen, ppm | 1500 |
| Basic Nitrogen, ppm | 466 |
| Sulfur, wt % | 0.72 |
| API Gravity | 22.0 |
| KV @ 100° C., cS | 18.52 |
| Composition, wt % | |
| Paraffins | 18.3 |
| Naphthenes | 32.2 |
| Aromatics | 49.5 |
| Sim Dist, wt % | |
| IBP | 765 |
| 5 | 846 |
| 10 | 880 |
| 95 | 1086 |
| Solvent Dewaxed Oil Properties | |
| KV @ 100° C., cS | 20.1 |
| VI | 53 |
| Pour Point, °F. | 0 |
| Lube Yield, wt % | 87 |

The heavy neutral distillate feed was processed over a fixed bed reactor containing a NiW/USY hydrocracking catalyst made by the following procedure: a commercial USY (PQ Corp. Z-14 USY) was combined with $Al_2O_3$ to form a mixture of 65 parts, by weight, zeolite and 35 parts alumina. Water was added to this mixture to allow the resulting catalyst to be formed into extrudates. The catalyst was then thermally treated at 1000° F. in flowing air for three hours. A portion of the resultant extrudate was exchanged with aqueous solutions of ammonium nitrate and was subsequently dried overnight at 250° F. Following a three hour 1000° F. air calcination, 100% steam was introduced and the temperature maintained at 1000° F. For 10 hours. Nickel and tungsten were incorporated via incipient wetness coimpregnation using solutions of Ni(NO3)2.6H2O and (NH4)6H2W12O40.H2O. After drying, the extrudates were calcined for three hours in flowing air at 1000° F. The Ni and W loadings on the final catalyst were 5.8 and 16.6 wt. %, respectively.

The processing conditions were 1500-2700 psig hydrogen pressure, 7500 SCFB hydrogen circulation and 0.5 to 1.0 LHSV. The total liquid product of the reactor was distilled to a nominal 650° F.+ cut-point and the feed was subsequently dewaxed with a 60/40 mixture of MEK/toluene. The results of these experiments are summarized in Table 3 below.

TABLE 3

(LHDC with NiW/USY)

| | | | |
|---|---|---|---|
| Temp., °F. | 700 | 725 | 750 |
| Pressure, psig | 2700 | 2700 | 1500 |
| LHSV | 0.5 | 0.5 | 1.0 |
| 650° F. + conv., wt % | 15.2 | 29.3 | 20.0 |
| Lube Properties | | | |
| KV @ 100° C., cS | 14.7 | 10.95 | 10.68 |
| SUS @ 100° F. | 982 | 519 | 515 |
| VI | 72 | 94 | 90 |
| Pour Point, °F. | 5 | 5 | 5 |
| Lube Yield, wt % | 80.9 | 60.1 | 63.5 |

EXAMPLE 22

This example illustrates the use of a commercially available amorphous catalyst (NiW/Al2O3) without any promoter. Conditions for this example were 2000 psig hydrogen pressure, 7500 SCFB hydrogen circulation, and 0.5 LHSV. Table 4 below summarizes results of this experimental run.

TABLE 4

(LHDC With Unfluorided NiW/alumina)

| | | | |
|---|---|---|---|
| Temp., °F. | 750 | 765 | 775 |
| Pressure, psig | 2000 | 2000 | 2000 |
| LHSV | 0.5 | 0.5 | 0.5 |
| 650° F. + conv., wt % | 15.5 | 21.5 | 28.2 |
| Lube Properties | | | |
| KV @ 100° C., cS | 11.44 | 9.83 | 8.86 |
| SUS @ 100° F. | 602 | 449 | 369 |
| VI | 83.9 | 91.7 | 97.0 |
| Pour Point, °F. | −5 | −5 | −10 |
| Lube Yield, wt % | 70.2 | 64.3 | 58.6 |

EXAMPLE 23

This example utilizes the same catalyst as Example 22 except that the catalyst is activated by in-situ fluoriding in the fixed bed reactor to achieve a target 2-5 weight percent fluorine on catalyst. This was accomplished by fluoriding the catalyst with a high level (600 ppm) of fluorine in the distillate for a one week period after which the fluorine level is reduced to a 25 ppm level at which it is held for the remainder of the experimental run. ortho-fluorotoluene was used as the fluoriding agent. Processing conditions were 2000 psig hydrogen, 7500 SCFB hydrogen circulation and 0.5 to 1.0 LHSV. The data from these experimental runs are given in Table 5 below.

TABLE 5

(LHDC With Fluorided NiW/alumina)

| | | | |
|---|---|---|---|
| Temp., °F. | 764 | 751 | 775 |
| Pressure, psig | 2000 | 2000 | 2000 |
| LHSV | 1.0 | 0.5 | 1.0 |
| 650° F. + conv., wt % | 16.3 | 18.9 | 21.7 |
| Lube Properties | | | |
| KV @ 100° C., cS | 10.22 | 9.25 | 9.12 |
| SUS @ 100° F. | 468 | 392 | 380 |
| VI | 93.8 | 97.5 | 98.8 |
| Pour Point, °F. | 30 | 20 | 20 |
| Lube Yield, wt % | 74.4 | 70.0 | 68.5 |

EXAMPLE 24

This example shows the benefits of using an M41S molecular sieve for selective lube hydrocracking. A NiW/MCM-41 catalyst was prepared as outlined below.

A sample of MCM-41 (40 Å) was prepared in accordance with the following method.

The following mixture (parts by weight) was charged to an autoclave:

83.7 pbw Cetyltrimethylammonium (CTMA) hydroxide, prepared by contacting a 29 wt. % N,N,N-trimethyl-hexadecylammonium chloride solution with a hydroxide-for-halide exchange resin 1.7 pbw Sodium aluminate, 4.1 pbw Tetramethylammonim silicate (10% aqueous solution), 10.5 pbw Precipitated hydrated silica (Hisil TM).

The mixture was crystallized at 100° C. for 20 hours with stirring under autogeneous pressure. The resulting product was recovered by filtration and dried in air at ambient temperature. A sample of the product was calcined at 540° C. for 1 hour in nitrogen, followed by 6 hours in air for characterization.

The calcined product had a surface area of 1120 m2/g and the following equilibrium adsorption capacities in grams/100 grams:

| | |
|---|---|
| H2O | 10.8 |
| Cyclohexane | >50 |
| n-hexane | >50 |
| Benzene | 67 |

The calcined product exhibited very strong relative intensity line at 38.4±2.0 Å d-spacing, and weak lines at 22.6±1.0, 20.0±1.0, and 15.2±1.0 Å.

The MCM-41 product was exchanged with room temperature aqueous solutions of ammonium nitrate and subsequently dried overnight at 250° F. A portion of the resultant crystals was combined with Al2O3 to form a mixture of 65 parts, by weight MCM-41 and 35 parts alumina. Water was added to this mixture to allow the resulting catalyst to be formed into extrudates. The catalyst was activated by calcination at 950° F. in 5 v/v/min of nitrogen for 6 hours followed by the replacement of the nitrogen with 5 v/v/min of air. The calcination was completed by raising the temperature to 1000° F. and maintaining that temperature in 5 v/v/min air for 18 hours. Nickel and tungsten were incorporated via incipient wetness coimpregnation using solutions of Ni(NO3)2.6H2O and (NH4)6H2W12O40.H2O. After drying overnight at 250° F., the extrudate was calcined in 5 v/v/min air at 1000° F. for 3 hours. Physical and chemical properties of the NiW/MCM-41/Al2O3 catalyst are:

| | |
|---|---|
| Nickel, wt % | 3.7 |
| Tungsten, wt % | 9.2 |
| Sodium, ppm | 200 |
| Surface Area, m2/ | 530 |
| Pore Volume, cc/g | 0.780 |
| Particle Density, g/cc | 0.883 |
| Real Density, g/cc | 2.837 |

This catalyst was used to hydrocrack the distillate at temperatures from 725° to 754° F., 2000 psig hydrogen pressure, 7500 SCFB hydrogen circulation and 0.55 to 0.61 LHSV. The data from these experimental runs are summarized in Table 6 below:

TABLE 6

| (LHDC with NiW/MCM-41) | | | |
|---|---|---|---|
| Temp., °F. | 725 | 739 | 754 |
| Pressure, psig | 2000 | 2000 | 2000 |
| LHSV | 0.61 | 0.54 | 0.55 |
| 650° F.+ conv., wt % | 9.3 | 20.8 | 36.0 |
| Lube Properties | | | |
| KV @ 100° C., cS | 13.08 | 10.46 | 7.59 |
| SUS @ 100° F. | 772 | 468 | 261 |
| VI | 79 | 98.1 | 113.3 |
| Pour Point, °F. | 15 | 30 | 30 |
| Lube Yield, wt % | 80.5 | 66.6 | 54.3 |

The NiW/MCM-41 catalyst was selective for upgrading the heavy neutral distillate from a raw distillate VI of 53 to a 98 VI product at a conversion level of 20.8 wt. %. The lube yield versus VI selectivity data for Examples 21 to 24 is represented in FIG. 1. It can be seen that the unfluorided NiW/MCM-41 catalyst produces a high VI product at a given lube yield or alternatively a higher lube yield at a given VI compared to the other unfluorided catalysts evaluated, i.e., NiW/USY or NiW/alumina. In the VI range of commercial significance (95-100 VI), the fluorided NiW/alumina catalyst has a slightly higher lube yield vs VI selectivity compared to the NiW/MCM-41 catalyst but has the drawback of requiring fluorine. Additionally, the activity of the NiW/MCM-41 catalyst as determined by the temperature requirement to achieve target conversion was very favorable compared to both the fluorided and unfluorided NiW/alumina catalysts. This is shown in Table 7 below where a nominal 20 wt. % 650° F.+ conversion severity was achieved.

TABLE 7

| | Catalyst activity | | |
|---|---|---|---|
| | NiW/MCM-41 | Unfluorided NiW/alumina | Fluorided NiW/alumina |
| Temp., °F. | 739 | 765 | 751 |
| 650° F.+ conv. wt % | 20.8 | 21.5 | 18.9 |
| Pressure, psig | 2000 | 2000 | 2000 |
| LHSV | 0.54 | 0.5 | 0.5 |

The NiW/MCM-41 catalyst was more active than both the fluorided and unfluorided NiW/alumina catalysts. Since lube hydrocracker catalysts typically age with time on-stream, the increased activity of the MCM-41 catalyst system is beneficial in terms of the potential for improvements in commercial cycle length.

EXAMPLE 25

This example provides a comparison with an amorphous catalyst in the hydroprocessing of a heavy slack wax. The feed was a heavy neutral (NH) slack wax whose properties are listed in Table 8 below.

TABLE 8

| Properties of Heavy Neutral Slack Wax | |
|---|---|
| Hydrogen, wt % | 14.56 |
| Nitrogen, ppm | 54 |
| Sulfur, wt % | 0.102 |
| API Gravity | 34.9 |
| KV @ 100° C., cS | 7.117 |
| Solvent Extractables, wt % (D3235) | 34.05 |
| Simulated Distillation, °F. | |
| IBP/5 | 736/805 |
| 10/20 | 828/858 |
| 30/40 | 879/898 |
| 50/60 | 916/936 |
| 70/80 | 957/982 |
| 90/EP | 1014/1095 |
| Dewaxed Oil Properties | |
| Nitrogen, ppm | 95 |
| Sulfur, wt % | 0.220 |
| Pour point, °F. | 0 |
| KV @ 40° C., cS | 92.04 |
| KV @ 100° C., cS | 10.53 |
| VI | 96.2 |
| Composition, wt % | |
| Paraffins | 23.2 |
| Mononaphthenes | 19.4 |
| Polynaphthenes | 37.1 |
| Aromatics | 20.3 |

The feed was processed over a fixed bed reactor containing NiW/alumina fluorided catalyst that was sulfided and then fluorided in-situ by adding 600 ppm of fluorine as ortho-fluorotoluene in the slack wax feed for approximately one week to target a fluorine level of 2–5 wt% on catalyst. The operating conditions for the run were 2000 psig hydrogen pressure 1 LHSV and the reactor temperature was varied from 705° to 755° F. to cover a wide conversion range. The total liquid product from the hydrocracking step was then distilled to a nominal 650° F.+ cut-point. The waxy bottoms was then solvent dewaxed to a target 0° F. pour point. The results of these runs are summarized in Table 9 below.

TABLE 9

| Wax Hydrocracking - NiW/Al2O3 Catalyst | | | | | | | |
|---|---|---|---|---|---|---|---|
| Mass Bal. No. | 411 | 412 | 413 | 415 | 416 | 417 | 418 |
| Reactor temp, °F. | 740 | 750 | 755 | 735 | 725 | 715 | 705 |
| 650° F.-Conv, wt % | 28 | 40 | 48 | 23 | 17 | 10 | 9 |
| Lube Properties | | | | | | | |
| KV @ 100° C. | 5.0 | 4.3 | 4.0 | 5.1 | 5.4 | 5.9 | 6.7 |
| VI | 137 | 143 | 140 | 146 | 141 | 137 | 131 |
| Pour Point, °F. | 5 | 0 | −5 | 0 | −5 | 5 | 15 |
| VI @ 0° F. Pour | 136 | 143 | 141 | 146 | 142 | 136 | 128 |
| Lube Yield, wt % | 40 | 43 | 42 | 40 | 34 | 33 | 29 |
| Wax Conversion | 50 | 74 | 84 | 42 | 24 | 12 | 4 |

Boiling point conversion is defined as:
650° F. - conversion =
$$\frac{650° F. + \text{ in Feed} - 650° F. + \text{ in Product}}{650° F. + \text{ in Feed}}$$
Wax Conversion is defined as:
Wax Conversion =
$$\frac{\text{Wt \% Wax in Feed} - (\text{Wt \% Uncovered Wax after Solvent Dewaxing})}{\text{Wt \% Wax in Feed}}$$

EXAMPLE 26

This example illustrates the use of the ultra-large pore size catalysts.

A NiW/MCM-41 catalyst was prepared as described below.

A sample of MCM-41 (40 Å) was prepared by crystallizing the following mixture in an autoclave:

60.7 pbw Cetyltrimethylammonium (CTMA) hydroxide, prepared by contacting a 29 wt. % N,N,N-trimethyl-1-hexadecylammonium chloride solution with a hydroxide-for-halide exchange resin 1.3 pbw Sodium aluminate, 30.4 pbw Tetramethylammonim silicate (10% aqueous solution), 7.6 pbw Precipitated hydrated silica (Hisil, TM).

The mixture was crystallized at 100° C. for 24 hours with stirring under autogeneous pressure. The resulting product was recovered by filtration and dried in air at ambient temperature. A sample of the product was calcined at 540° C. for 1 hour in nitrogen, followed by 6 hours in air. The characteristics of the product were consistent with its identity as MCM-41.

The MCM-41 was exchanged with room temperature aqueous solutions of ammonium nitrate and subsequently dried overnight at 250° F. A portion of the resultant crystals were combined with $Al_2O_3$ to form a mixture of 65 parts, by weight MCM-41 and 35 parts alumina. Water was added to this mixture to allow the resulting catalyst to be formed into extrudates. The catalyst was activated by calcination at 950° F. in 5 v/v/min of nitrogen for 6 hours followed by the replacement of the nitrogen with 5 v/v/min of air. The calcination was completed by raising the temperature of 1000° F. and maintaining that temperature in 5 v/v/min air for 18 hours. Nickel and tungsten were incorporated by incipient wetness coimpregnation using solutions of $Ni(NO_3)_2.6H_2O$ and $(NH_4)_6H_2W_{12}O.4OH_2O$. After drying for 12 hours at 250° F., the extrudate was calcined in 5 v/v min air at 1000° F. for 3 hours.

The physical and chemical properties of the NiW/MCM-41/Al2O3 catalyst are set out below:

| | |
|---|---|
| Nickel, wt % | 5.8 |
| Tungsten, wt % | 29.1 |
| Sodium, ppm | 200 |
| Surface Area, m2/g | 242 |
| Packing Density, g/cc | 0.749 |

This catalyst was used for wax hydrocracking/hydroisomerization at the following process conditions: 2000 psig hydrogen pressure, 7500 SCF/Bbl hydrogen circulation and 1 LHSV, as in Example 21, using the same wax feed as in Example 25. The operating temperature was adjusted from 720° to 746° F. to span a range of 650° F.— boiling point conversions. The results of these runs are given in Table 10.

TABLE 10

| | Wax HDC/HDI | | | | | | | |
|---|---|---|---|---|---|---|---|---|
| Mass Bal. No. | 82 | 84 | 85 | 86 | 87 | 88 | 90 | 92 |
| Reactor temp, °F. | 720 | 725 | 725 | 733 | 732 | 740 | 746 | 731 |
| 650° F.— Conv, wt % | 18.4 | 21.5 | 23.6 | 29.2 | 29.8 | 41.1 | 59.5 | 35.6 |
| Lube Properties: | | | | | | | | |
| KV @ 100° | 5.81 | 5.47 | 5.30 | 4.86 | 4.857 | 4.55 | 4.29 | 5.02 |
| VI | 143.6 | 145.7 | 144.3 | 142.8 | 145.7 | 142.0 | 141.3 | 145.6 |
| Pour Point, °F. | 20 | 5 | 5 | 5 | 5 | 10 | 10 | 5 |
| VI @ 0° F. Pour Pt | 139.6 | 144.7 | 143.3 | 141.8 | 144.7 | 140 | 139.3 | 144.6 |
| Lube Yield, wt % | 39.5 | 38.6 | 40.3 | 47.6 | 44.3 | 47.5 | 43.9 | 47.2 |
| Wax Conversion | 42.3 | 49.6 | 42.7 | 65.4 | 68.7 | 81.3 | 84.7 | 65.6 |

FIG. 2 of the drawings shows that the activity of the NiW/MCM-41 is higher than the activity of the fluorided NiW/alumina catalyst. For example, at 30 wt% 650° F.— conversion, the fluorided catalyst required at 742° F. reactor temperature, whereas, the MCM-41 catalyst required about 10° F. lower temperature of 732° F. In the preferred boiling point conversion range of about 30–60 wt% 650° F. conversion or greater, this activity advantage is beneficial in terms of lower start-of-cycle temperature and potentially longer catalyst life.

Figure 1:
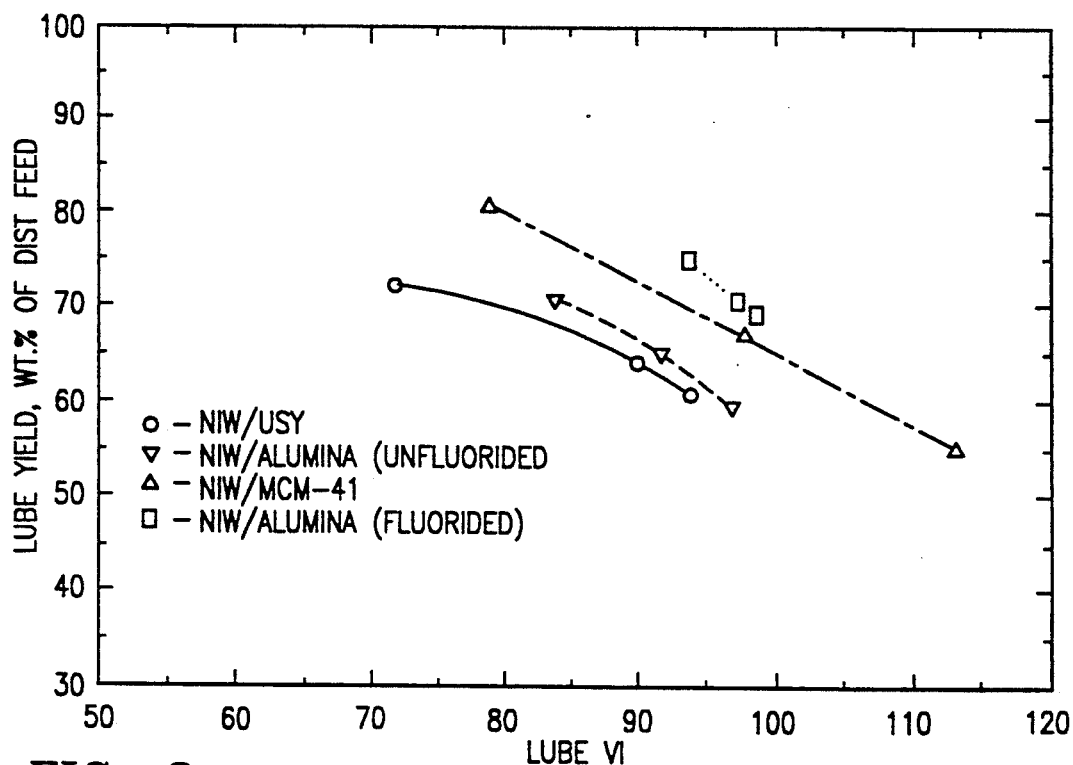
Figure 2:
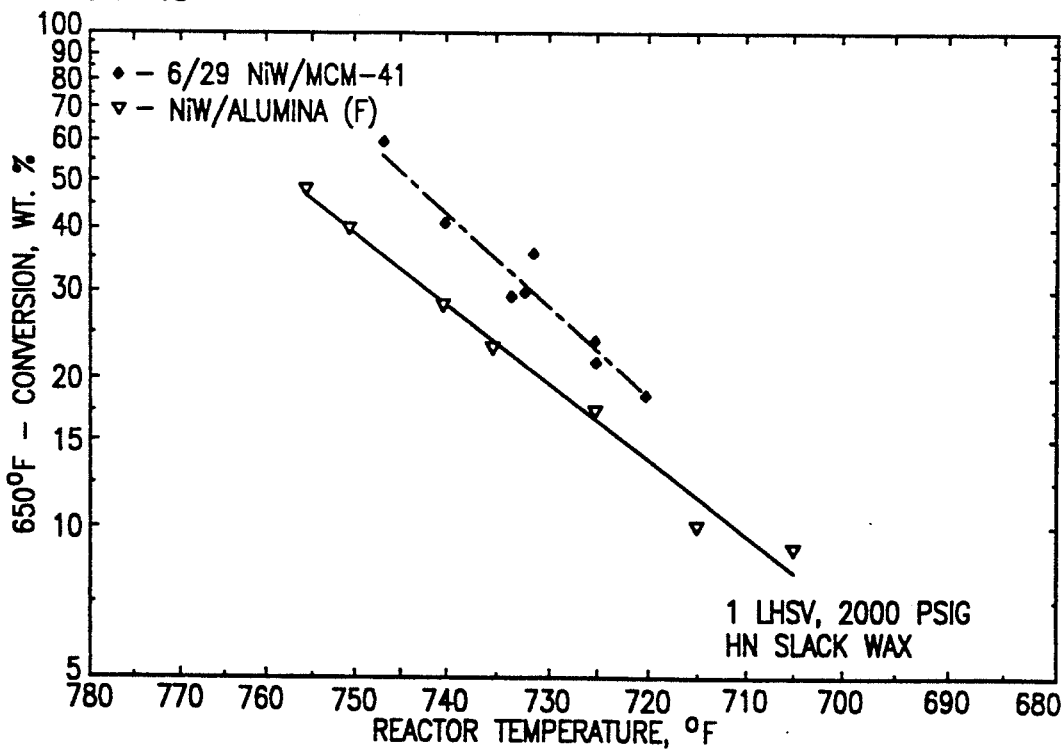
Figure 3:
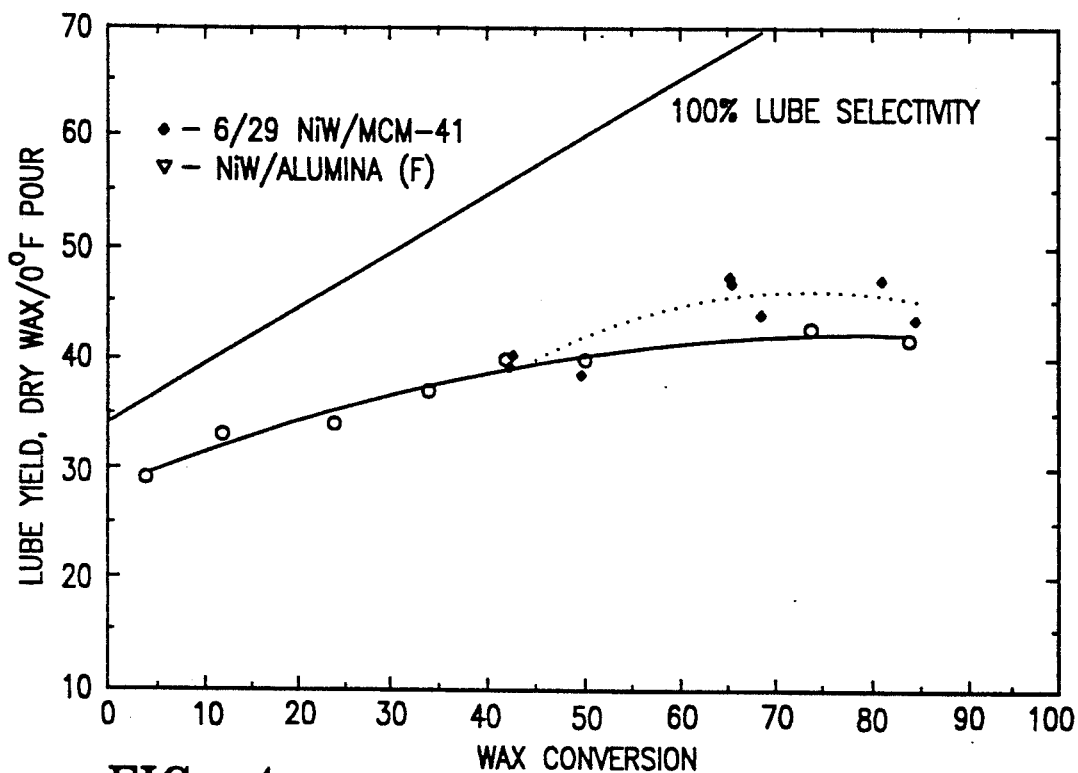
FIG. 3 shows that the lube yield for the fluorided NiW/alumina and the NiW/MCM-41 catalysts are similar at low wax conversions below 50 wt%, but at higher wax conversion the unpromoted NiW/MCM-41 catalyst has a desirable yield number benefit compared to the fluorided NiW/alumina catalyst.
Figure 4:
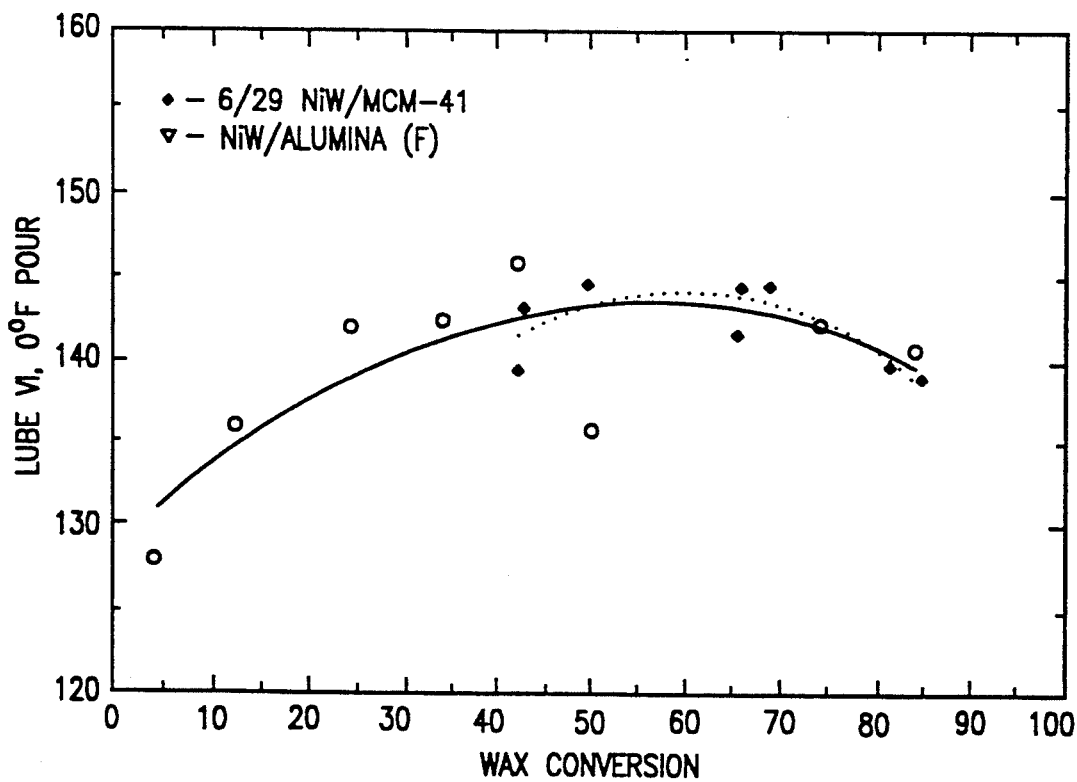
FIG. 4 shows that the lube VI of the NiW/MCM-41 is comparable to the VI obtained with the fluorided NiW/alumina catalyst. In the wax conversion range of commercial interest (50-70 wt%), the MCM-41 catalyst gives a consistantly higher than 140 VI product which is comparable to the fluorided catalyst.
Figure 5:
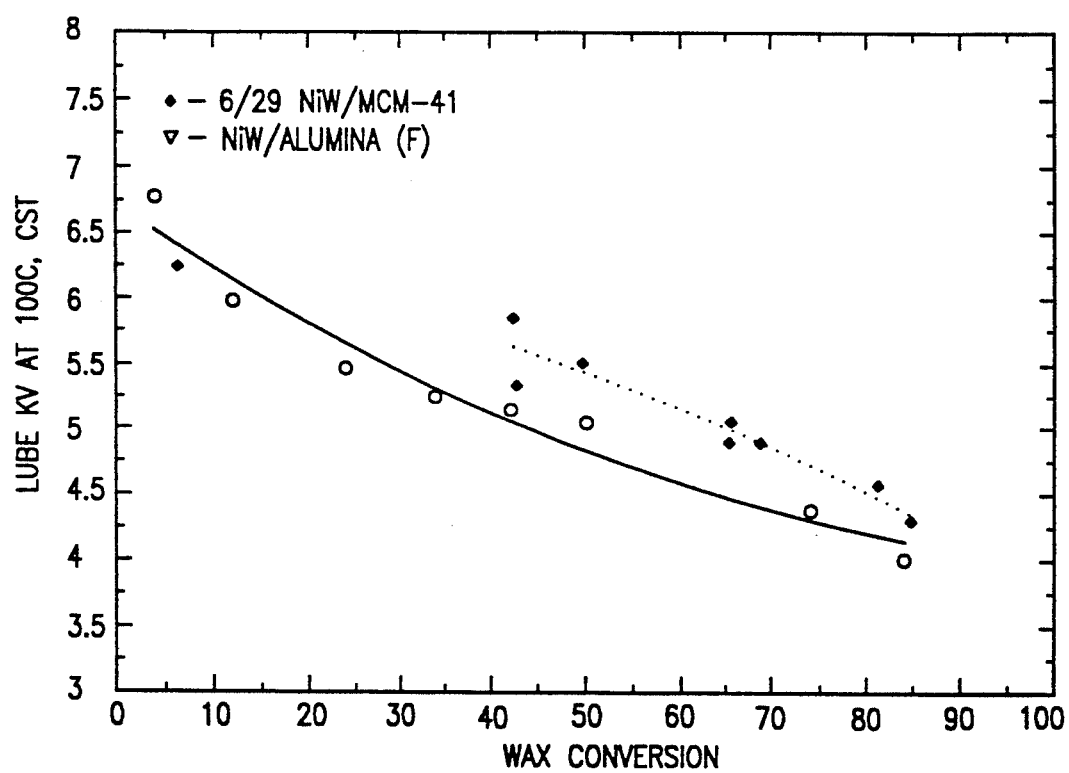

FIG. 5 shows a viscosity benefit of the MCM-41 products. At a given wax conversion the lubes obtained from the MCM-41 based catalyst are higher in viscosity than the fluorided amorphous catalyst. Since the wax hydrocracking/hydroisomerization process significantly reduces the viscosity of the hydrocracked/hydroisomerized feed, it is desirable to maintain viscosity as high as possible. For example, the target viscosity for this feed is 5 cS at 100° C.; the fluorided alumina catalyst can achieve this at 50 wt% wax conversion. The MCM-41 can operate at much higher wax conversion of 65 wt% and still achieve target viscosity. There are significant commercial benefits to operating at higher wax conversion, such as, reduction in MEK loading with higher wax conversion and reduction in size of the unconverted wax recycle stream.

A hydrotreating reactor may be provided downstream of the hydroisomerization reactor to further stabilize the lube product.

We claim:

1. A bifunctional hydroprocessing catalyst which comprises a metal component having hydrogenation/dehydrogenation functionality and a support component comprising an inorganic, non-layered, porous, crystalline phase material having pores with diameters of at least about 13 Å and exhibiting, after calcination, an X-ray diffraction pattern with at least one peak with a relative intensity of 100 at a d-spacing greater than about 18 Å, the catalyst having a surface area S, where S, expressed in $m^2.g^{-1}$, is defined by the equation:

$$S \geq 600 - 13.3X$$

where X is the total metals loading in weight percent and is least 12 weight percent.

2. A hydroprocessing catalyst according to claim 1 in which the crystalline phase material has, after calcination, a hexagonal arrangement of unifromly-sized pores with diameters of at least about 13 Å and exhibits a hexagonal electron diffraction pattern that can be indexed with a $d_{100}$ value greater than about 18 Å.

3. A hydroprocessing catalyst according to claim 1 in which the crystalline phase has an X-ray diffraction pattern following calcination with at least one peak whose d-spacing corresponds to the $d_{100}$ value from the electron diffraction pattern.

4. A hydroprocessing catalyst according to claim 1 in which the crystalline phase exhibits a benzene adsorption capacity of greater than about 15 grams benzene per 100 grams at 50 torr and 25° C.

5. A hydroprocessing catalyst according to claim 1 in which the crystalline phase has a composition expressed as follows:

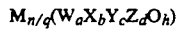

$$M_{n/q}(W_aX_bY_cZ_dO_h)$$

wherein M is one or more ions; n is the charge of the composition excluding M expressed as oxides; q is the weighted molar average valence of M; n/q is the number of moles or mole fraction of M; W is one or more divalent elements; X is one or more trivalent elements; Y is one or more tetravalent elements; Z is one or more pentavalent elements; a, b, c, and d are mole fraction of W, X, Y, and Z, respectively, h is a number of from 1 to 2.5; and $(a+b+c+d)=1$.

6. A hydroprocessing catalyst according to claim 5 wherein W is a divalent first row transition metal or magnesium; X comprises aluminum, boron, gallium or iron; Y comprises silicon or germanium; and Z comprises phosphorus.

7. A hydroprocessing catalyst according to claim 5 wherein a and d are 0 and $h=2$.

8. A hydroprocessing catalyst according to claim 7 wherein X is aluminum, boron, gallium or iron and Y comprises silicon or germanium.

9. A hydroprocessing catalyst according to claim 8 wherein X is aluminum and Y comprises silicon.

10. A hydroprocessing catalyst according to claim 1 in which the catalyst is at least one base metal of Group VIA, VIIA or VIIIA of the Periodic Table.

11. A hydroprocessing catalyst according to claim 1 in which the catalyst is at least one base metal of Group VIA and at least one base metal of Group VIIIA of the Periodic Table.

12. A hydroprocessing catalyst according to claim 1 having a surface area of at least 200 m²g⁻¹ and a total metal content of at least 12 weight percent.

13. A hydroprocessing catalyst according to claim 12 having a surface area of at least 200 m²g⁻¹ and a total metal content of at least 20 weight percent.

14. A hydroprocessing catalyst according to claim 12 having a surface area of at least 100 m²g⁻¹ and a total metal content of at least 30 weight percent.

15. A hydroprocessing catalyst according to claim 14 in which the surface area is at least 150 m.²g.⁻¹.

16. A hydroprocessing catalyst according to claim 1 having a surface area of at least 300 m²g⁻¹ and a total metal content of 12 to 20 weight percent.

17. A hydroprocessing catalyst according to claim 1 having a surface area of at least 200 m²g⁻¹, a total metal content of at least 12 weight percent and a pore volume of at least 0.6 cc.g⁻¹.

18. A hydroprocessing catalyst according to claim 1 having a surface area of at least 300 m²g⁻¹, a total metal content of 12 to 20 weight percent and a pore volume of 0.6 to 0.8 cc.g⁻¹.

19. A hydroprocessing catalyst according to claim 1 having a surface area of at least 200 m²g⁻¹, a total metal content of at least 12 weight percent and a real density of up to 6.0 g.cc⁻¹.

20. A hydroprocessing catalyst according to claim 19 having a surface area of at least 300 m²g⁻¹, a total metal content of 12 to 20 weight percent and a real density of not more than 3.5 g.cc⁻¹.

21. A method of making a hydroprocessing catalyst which comprises incorporating a metal component having hydrogenation/ dehydrogenation functionality into an inorganic, non-layered, porous, crystalline phase material having pores with diameters of at least about 13 Å and exhibiting, after calcination, an X-ray diffraction pattern with at least one peak with a relative intensity of 100 at a d-spacing greater than about 18 Å, to produce a bifunctional catalyst having a surface area, S, expressed in m².g⁻¹., defined by the equation:

$$S \geq 600 - 13.3X$$

where X is the metal content in weight percent and is at least 12 weight percent.

22. A method of making a hydroprocessing catalyst according to claim 21 in which the crystalline phase material has, after calcination, a hexagonal arrangement of uniformly-sized pores with diameters of at least about 13 Å and exhibits a hexagonal electron diffraction pattern that can be indexed with a $d_{100}$ value greater than about 18 Å.

23. A method of making a hydroprocessing catalyst according to claim 21 in which the crystalline phase has an X-ray diffraction pattern following calcination with at least one peak whose d-spacing corresponds to the $d_{100}$ value from the electron diffraction pattern.

24. A method of making a hydroprocessing catalyst according to claim 21 in which the crystalline phase exhibits a benzene adsorption capacity of greater than about 15 grams benzene per 100 grams at 50 torr and 25° C.

25. A method of making a hydroprocessing catalyst according to claim 21 in which the crystalline phase is a metallosilicate.

26. A method of making a hydroprocessing catalyst according to claim 25 in which the crystalline phase comprises an aluminosilicate.

27. A method of making a hydroprocessing catalyst according to claim 21 in which the metal component is at least one base metal of Groups VIA, VIIA or VIIIA of the Periodic Table.

28. A method of making a hydroprocessing catalyst according to claim 21 in which the metal component is at least one base metal of Group VIA and at least one base metal of Group VIIIA of the Periodic Table.

29. A method of making a hydroprocessing catalyst according to claim 21 in which the catalyst after incorporation of the metal has a surface area of at least 300 m²g⁻¹ and a total metal content of at least 20 weight percent.

30. A method of making a hydroprocessing catalyst according to claim 21 in which the catalyst after incorporation of the metal has a surface area of at least 200 m²g⁻¹ and a total metal content of at least 30 weight percent.

31. A method of making a hydroprocessing catalyst according to claim 21 in which the catalyst after incorporation of the metal has a surface area of at least 300

$m^2g^{-1}$ and a total metal content of 20 to 20 weight percent.

32. A method of making a hydroprocessing catalyst according to claim 21 in which the catalyst after incorporation of the metal has a surface area of at least 200 $m^2g^{-1}$, a total metal content of at least 12 weight percent and a pore volume of at least 0.6 $cc.g^{-1}$.

33. A method of making a hydroprocessing catalyst according to claim 21 in which the catalyst after incorporation of the metal has a surface area of at least 300 $m^2g^{-1}$, a total metal content of 12 to 20 weight percent and a pore volume of 0.6 to 0.8 $cc.g^{-1}$.

34. A method of making a hydroprocessing catalyst according to claim 21 in which the catalyst after incorporation of the metal has a surface area of at least 200 $m^2g^{-1}$, a total metal content of at least 12 weight percent and a real density of up to 6.0 $g.cc^{-1}$.

35. A method of making a hydroprocessing catalyst according to claim 21 in which the catalyst after incorporation of the metal has a surface area of at least 300 $m^2g^{-1}$, a total metal content of 12 to 20 weight percent and a real density of not more than 3.5 $g.cc^{-1}$.

36. A method of making a catalyst according to claim 21 in which the metal is incorporated by impregnation into the calcined crystalline material.

37. A method of making a catalyst according to claim 21 in which the metals of the metal component are incorporated by impregnation into the calcined crystalline material.

38. A method of making a catalyst according to claim 37 in which the metals are incorporated by the incipient wetness method.

39. A method of making a catalyst according to claim 21 in which the metals are incorporated in to the calcined crystalline material in the absence of a fluorine-containing promoter.

40. A method of making a catalyst according to claim 21 in which the pore diameter of the catalyst is at least 30 Å.

41. A bifunctional hydroprocessing catalyst which comprises a metal component having hydrogenation/dehydrogenation functionality and a support component comprising an inorganic, porous, crystalline phase material having a hexagonal arrangement of uniformly-sized pores with diameters of at least about 15 Å and exhibiting, after calcination, an X-ray diffraction pattern with at least one peak with a relative intensity of 100 at a d-spacing greater than about 18 Å and a hexagonal electron diffraction pattern that can be indexed with a $d_{100}$ value greater than about 18 Å, the catalyst having a surface area S, where S, expressed in $m^2.g^{-1}$, is defined by the equation:

$$S \geq 600 - 13.3X$$

where X is the total metals loading in weight percent and is least 12 weight percent.

42. A hydroprocessing catalyst according to claim 41 in which the crystalline phase has an X-ray diffraction pattern following calcination with at least one peak whose d-spacing corresponds to the $d_{100}$ value from the electron diffraction pattern.

43. A hydroprocessing catalyst according to claim 41 in which the crystalline phase exhibits a benzene adsorption capacity of greater than about 15 grams benzene per 100 grams at 50 torr and 25° C.

44. A hydroprocessing catalyst according to claim 41 in which the crystalline phase has a composition expressed as follows:

$$M_{n/q}(W_aX_bY_cZ_dO_h)$$

wherein M is one or more ions; n is the charge of the composition excluding M expressed as oxides; q is the weighted molar average valence of M; n/q is the number of moles or mole fraction of M; W is one or more divalent elements; X is one or more trivalent elements; Y is one or more tetravalent elements; Z is one ore more pentavalent elements; a, b, c, and d are mole fractions of W, X, Y, and Z, respectively, h is a number of from 1 to 2.5; and $(a+b+c+d)=1$.

45. A hydroprocessing catalyst according to claim 44 wherein W comprises a divalent first row transition metal or magnesium; X comprises aluminum, boron, gallium or iron; Y comprises silicon or germanium; and Z comprises phosphorus.

46. A hydroprocessing catalyst according to claim 44 wherein a and d are 0 and h=2.

47. A hydroprocessing catalyst according to claim 46 wherein X comprises aluminum, boron, gallium or iron and Y comprises silicon or germanium.

48. A hydroprocessing catalyst according to claim 47 wherein X comprises aluminum and Y comprises silicon.

49. A hydroprocessing catalyst according to claim 41 in which the catalyst comprises at least one base metal of Groups VIA, VIIA and VIIIA of the Periodic Table.

50. A hydroprocessing catalyst according to claim 49 in which the catalyst comprises at least one base metal of Group VIA and at least one base metal of Group VIIIA of the Periodic Table.

51. A hydroprocessing catalyst according to claim 41 having a surface area of at least 200 $m^2g^{-1}$ and a total metal content of at least 12 weight percent.

52. A hydroprocessing catalyst according to claim 42 having a surface area of at least 200 $m^2g^{-1}$ and a total metal content of at least 20 weight percent.

53. A hydroprocessing catalyst according to claim 42 having a surface area of at least 100 $m^2g^{-1}$ and a total metal content of at least 30 weight percent.

54. A hydroprocessing catalyst according to claim 54 in which the surface area is at least 150 $m.^2g.^{-1}$.

55. A hydroprocessing catalyst according to claim 41 having a surface area of at least 300 $m^2g^{-1}$ and a total metal content of 12 to 20 weight percent.

56. A hydroprocessing catalyst according to claim 41 having a surface area of at least 200 $m^2g^{-1}$, a total metal content of at least 12 weight percent and a pore volume of at least 0.6 $cc.g^{-1}$.

57. A hydroprocessing catalyst according to claim 41 having a surface area of at least 300 $m^2g^{-1}$, a total metal content of 12 to 20 weight percent and a pore volume of 0.6 to 0.8 $cc.g^{-1}$.

58. A hydroprocessing catalyst according to claim 41 having a surface area of at least 200 $m^2g^{-1}$, a total metal content of at least 12 weight percent and a real density of up to 6.0 $g.cc^{-1}$.

59. A hydroprocessing catalyst according to claim 19 having a surface area of at least 300 $m^2g^{-1}$, a total metal content of 12 to 20 weight percent and a real density of not more than 3.5 $g.cc^{-1}$.

60. A method of making a hydroprocessing catalyst which comprises incorporating a metal component having hydrogenation/dehydrogenation functionality into an inorganic, porous, crystalline phase material having pores with diameters of at least about 13 Å and exhibiting, after calcination, a hexagonal X-ray diffraction pattern with at least one peak with a relative intensity of 100 at a d-spacing greater than about 18 Å, and a hexagonal electron diffraction pattern that can be indexed with a $d_{100}$ value greater than about 18 Å, to produce a bifunctional catalyst having a surface area, S, expressed in $m^2.g^{-1}$, defined by the equation:

$$S \geq 600 - 13.3X$$

where X is the metal content in weight percent and is at least 12 weight percent.

61. A method of making a hydroprocessing catalyst according to claim 60 in which the crystalline phase has an X-ray diffraction pattern following calcination with at least one peak whose d-spacing corresponds to the $d_{100}$ value from the electron diffraction pattern.

62. A method of making a hydroprocessing catalyst according to claim 60 in which the crystalline phase exhibits a benzene adsorption capacity of greater than about 15 grams benzene per 100 grams at 50 torr and 25° C.

63. A method of making a hydroprocessing catalyst according to claim 60 in which the crystalline phase comprises an aluminosilicate.

64. A method of making a hydroprocessing catalyst according to claim 60 in which the metal component comprises at least one base metal of Group VIA and at least one base metal of Group VIIIA of the Periodic Table.

65. A method of making a catalyst according to claim 60 in which the metal is incorporated by impregnation into the calcined crystalline material.

* * * * *